Dec. 25, 1945. O. W. WILSON ET AL 2,391,497
FILM HANDLING APPARATUS AND MAGAZINE FOR USE THEREWITH
Filed Sept. 1, 1943 10 Sheets-Sheet 1

INVENTORS.
Oliver Whitwell Wilson
Warren Dunham Foster
BY
ATTORNEY

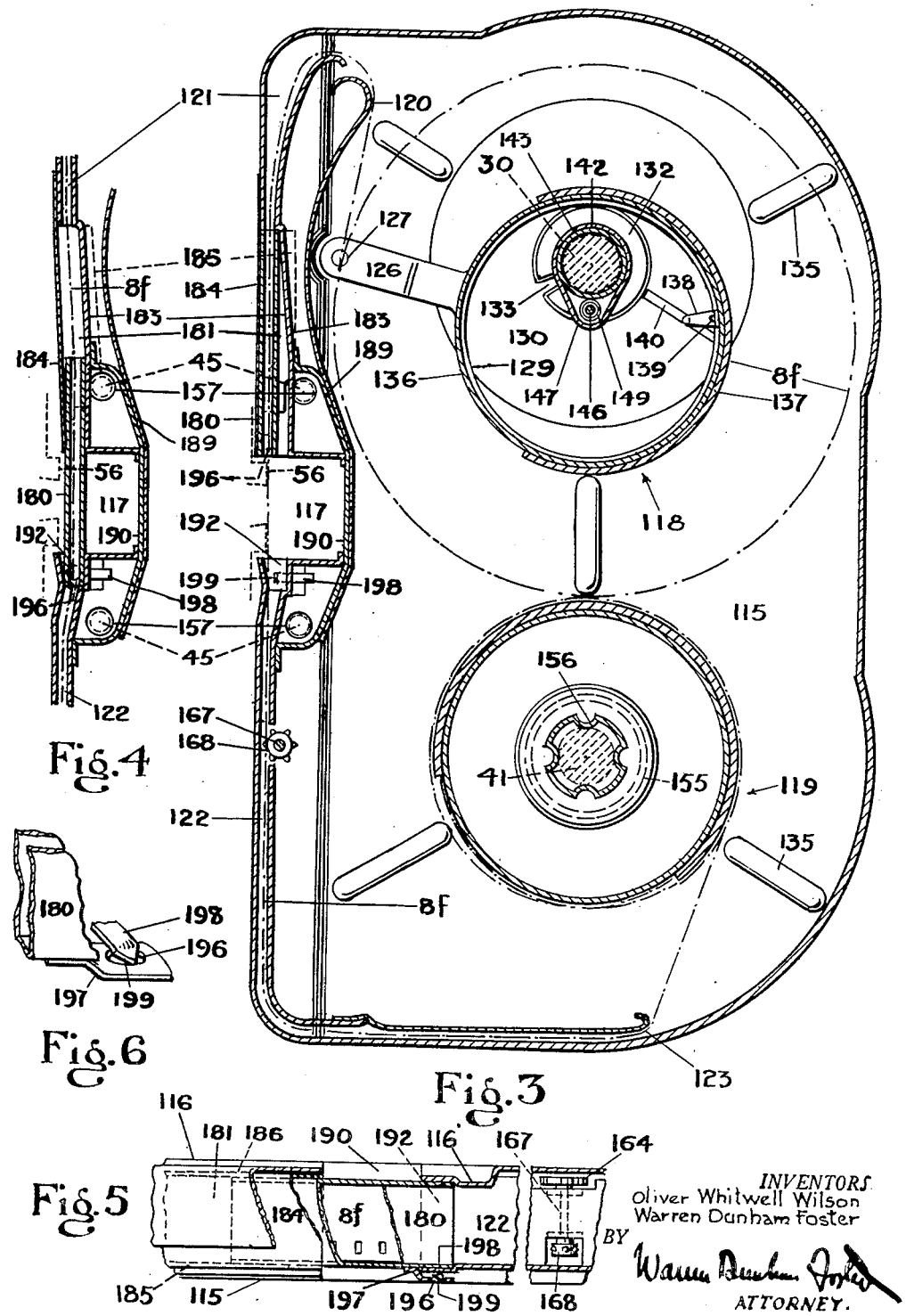

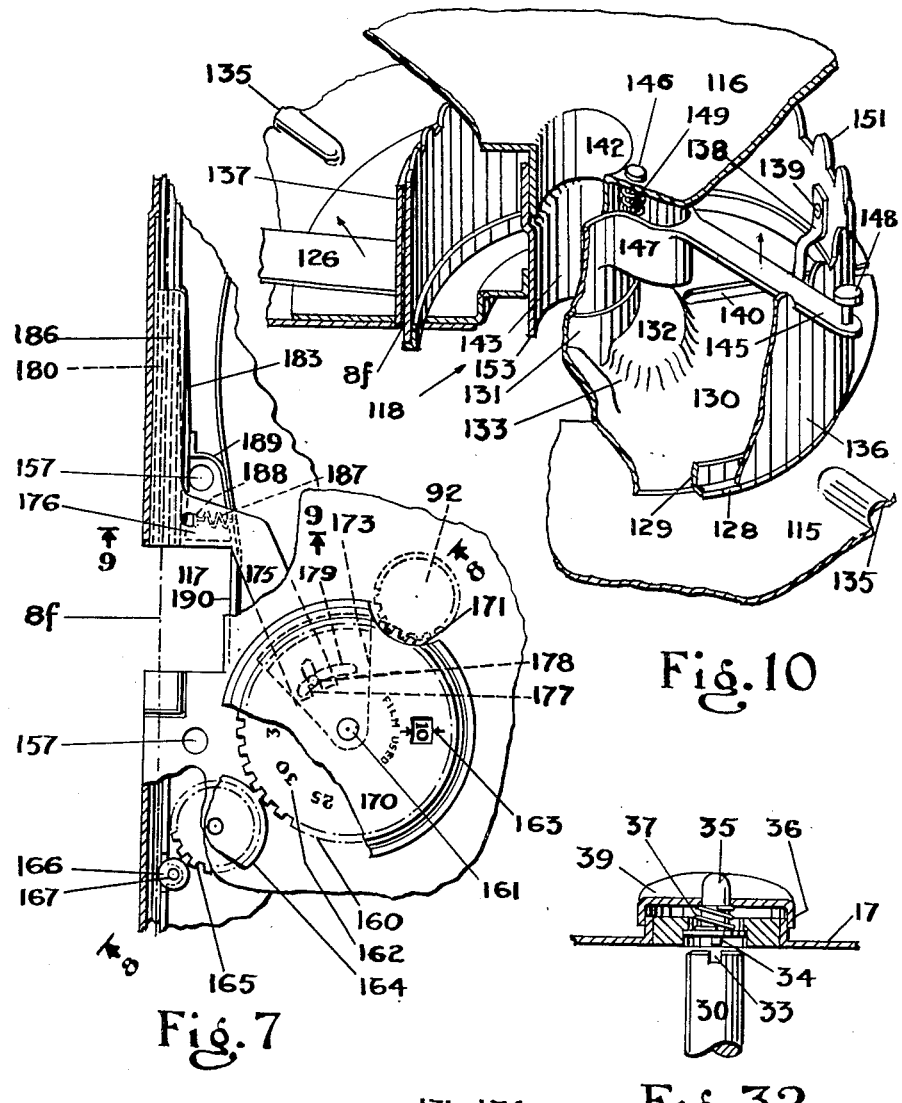

Inventors
Oliver Whitwell Wilson
Warren Dunham Foster

Attorney

INVENTORS.
Oliver Whitwell Wilson
Warren Dunham Foster

Inventors
Oliver Whitwell Wilson
Warren Dunham Foster
Attorney

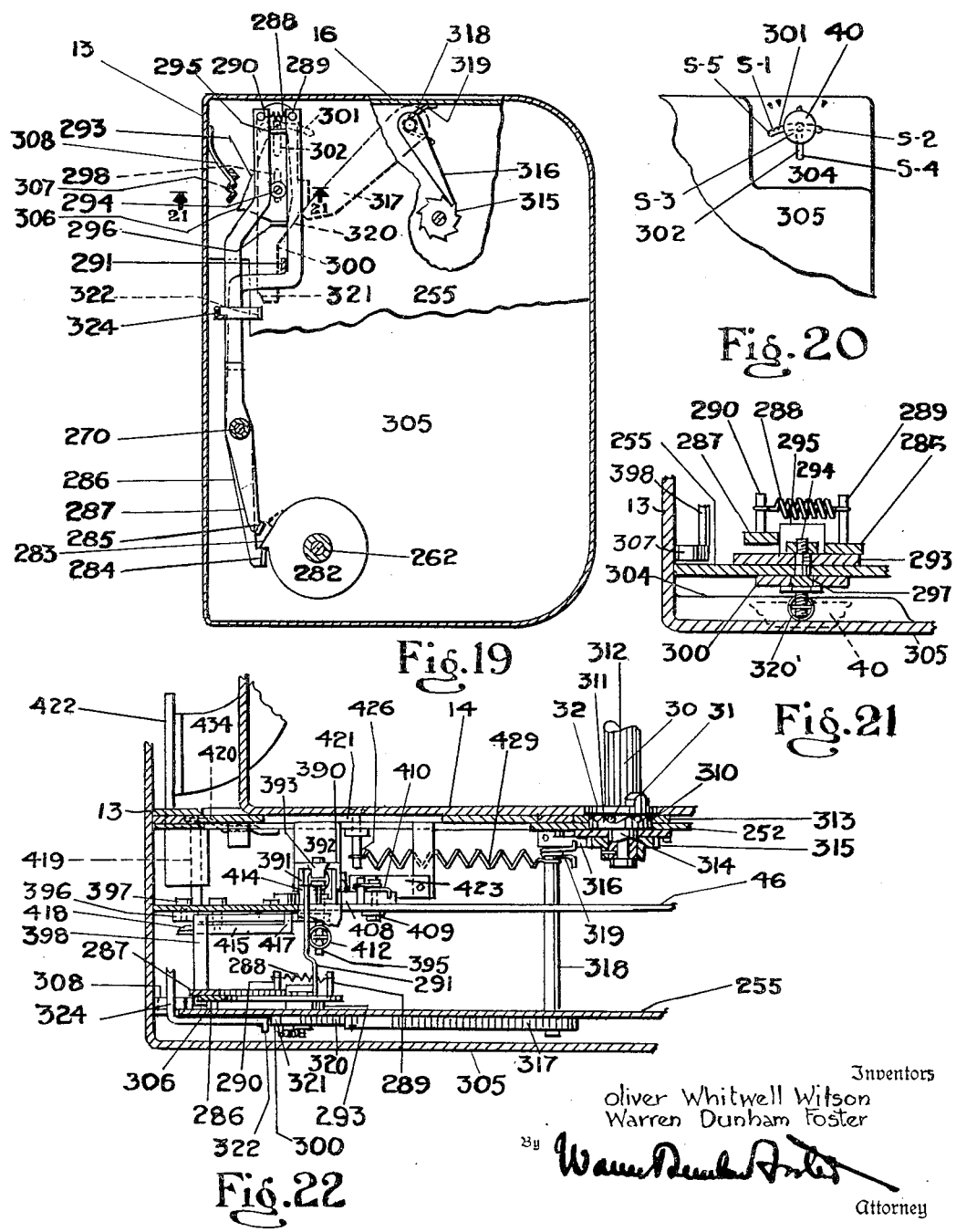

INVENTORS.
Oliver Whitwell Wilson
Warren Dunham Foster

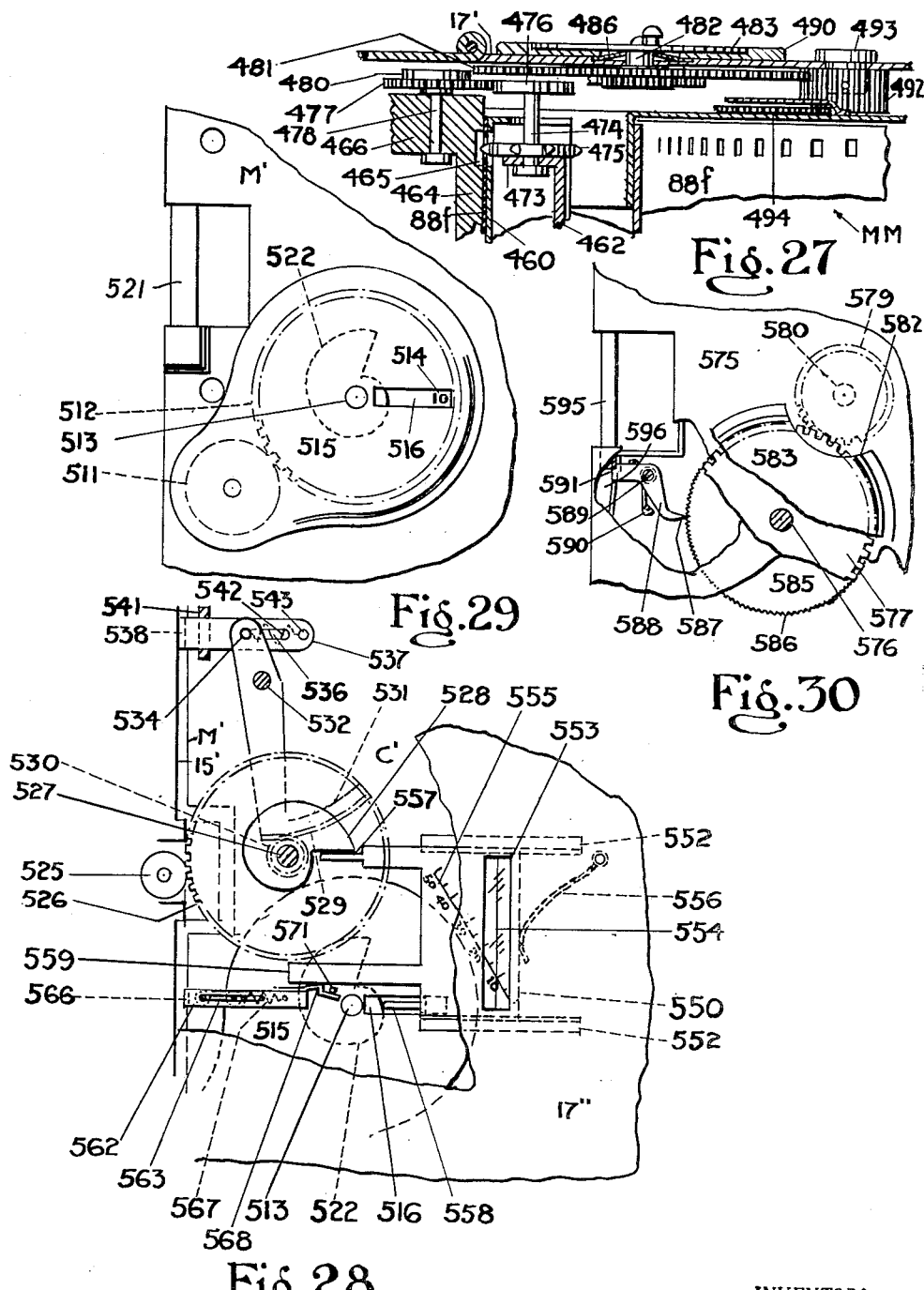

Patented Dec. 25, 1945

2,391,497

UNITED STATES PATENT OFFICE 2,391,497

FILM HANDLING APPARATUS AND MAGAZINE FOR USE THEREWITH

Oliver Whitwell Wilson, New York, N. Y., and Warren Dunham Foster, Eustis Fla.; said Wilson assignor to said Foster Application September 1, 1943, Serial No. 500,862

78 Claims. (Cl. 88—17)

Our invention is particularly directed to amateur users of motion pictures but its utility is not so limited. For purposes of illustration only, our invention is described as applied to a camera, but we wish it to be understood that it can be used in many different types of film handling apparatus, including apparatus for the projection or printing of pictures or for the recording or reproduction of sound, either alone or in connection with motion pictures. It also may be applied to apparatus for the making, reproduction or processing of successive still pictures.

This application is a continuation-in-part of our copending application, Serial Number 357,802, which was filed September 21, 1940, and upon June 13, 1944, matured as Patent Number 2,351,088. In said parent patent, we illustrate, describe and claim film handling apparatus with which either films supported upon open reels or those housed within a magazine may be alternatively employed. Also we describe and claim improved magazines for use therewith.

As is known to those skilled in this art, for most effective use by an amateur, or indeed by a professional, films are preferably contained, shipped, stored, sold, used and returned to the manufacturer for processing in separate relatively inexpensive magazines which are loaded at their factories by the suppliers of the films. The user merely opens his camera and drops one of these magazines into a compartment therein which is made to receive it. In the most advanced apparatus, the film is thereupon automatically made ready for exposure without any handling or manipulation. After the film has been exposed or otherwise used, or, indeed, before complete exposure, an operator can take this magazine out of his camera and instantly replace it with another. Apparatus making use of magazines have enjoyed wide commercial success throughout the world.

The only objection seriously urged against this type of apparatus is that the magazines may not be universally obtainable and the user at times may find himself where he cannot purchase a fresh supply; also certain types of films in the past have not been made readily available in magazines, although widely sold upon open reels. Moreover, some users have objected to higher prices charged for films within a magazine.

A chief objection to the use of a film mounted upon an open reel and not in a magazine is that the user must thread the film by hand into operative relation with the various film-engaging parts of the apparatus and must by hand attach the leading end to a take-up member, an operation which demands skill, bother, and patience and often causes trouble. In our parent patent means are shown which overcome, so far as is easily practicable, this and other disadvantages of the use of a film positioned upon an open reel.

A primary purpose of our parent invention is to provide apparatus which will interchangeably and alternatively accommodate a film supported within a magazine or one supported upon an open reel, thus providing in one apparatus opportunity for enjoying the advantages of both types without the disadvantages of either. We therein describe and claim apparatus of a duplex type wherein the instrumentalities necessary for the largely automatic positioning and handling of a film disposed upon an open reel are automatically removed from operative position by the placing of a magazine within the apparatus, and are automatically prepared for use by an open reel when the magazine is removed, as well as alternative structure which accomplishes the same end.

A primary and important object of the present invention is to provide improvements upon the film handling apparatus and magazines and each thereof described and claimed in our said parent patent.

Although our invention is not so limited, the magazines which we prefer to employ are an improvement of that of the widely used type shown by the patent to Ford Number 1,944,023, dated January 16, 1934, the junior applicant herein Number 1,975,782, dated October 9, 1934, and Morsbach Numbers 2,159,998 and 2,175,538, dated May 30, 1939, and October 10, 1939, respectively.

A film housed in such a magazine is positioned at the aperture, and hence in the focal plane of the apparatus, not by the magazine but by fixed and movable gate members carried by the apparatus itself and, preferably also, by a movable edge guide so carried. Magazines of this type are supplied with a gate receiving recess which the film bridges. As the magazine is placed within its compartment within the apparatus, the gate members are separated and the film drops between a fixed member and a movable member. Upon the closing of the gate by the movement of the movable member into engagement with the film and the movement thereby of the film into contact with the fixed gate section, the film is accurately positioned in the focal plane of the apparatus. A great advantage of this system is that the parts which determine the focal plane and hence must be made with relatively very great accuracy are provided by the camera which can be and is a precision instrument. The magazine, on the other hand, of which much greater numbers must be provided, is a relatively cheaply manufactured device in which the tolerances may be very much greater.

An important object of this invention is the provision of an improved magazine of the above type in combination with a film handling apparatus. This improved magazine per se is not claimed herein.

In the copending application of the junior applicant, Serial Number 536,128 filed May 18, 1944, an improved magazine and apparatus accommodating it are described and claimed wherein a movable gate plate is carried by a magazine while a fixed gate plate and means to operate and accurately to position such a movable gate plate are carried by the apparatus. An important object of this invention as will later more fully appear is to provide improved means for actuating and accurately positioning operable parts of an improved magazine and an apparatus adapted to receive it, said magazine carrying a movable gate plate and said apparatus embodying a fixed gate plate and means for operating and accurately positioning said movable gate plate.

Certain of the novel features of this invention may also be used in combination with a magazine of the types in which the movable section of a gate is carried by a magazine or of the Thornton type wherein the magazine carries a gate section and also compensating sprockets which are continuously driven by a camera with which it is used.

In conventional apparatus in this art as well as in a camera which is described in order to illustrate this invention, a film, whether supported upon open reels or housed within a magazine, is placed in a film receiving compartment within a film handling apparatus, this compartment being provided with a cover. The film moved from a delivery mass through a gate which consists of a fixed section and a section movable relatively thereto, and wound upon a continuously but yieldingly driven take-up mass. This movement through the gate is by an intermittently moving pull-down claw and during the periods in which it is motionless, the film may be held fixed therein by a positioning claw. In order to compensate for the difference in character of movement of the film between the portion which is stopped and started at the exposure aperture of the gate and that of the continuously moving delivery and take-up masses, compensation is ordinarily provided, either in the form of conventional continuous sprockets with their unsupported loops of slack film or the Bundick & Proctor tension control system of feeding. The film must be started and stopped. There are many conventional and other modifications of the above mechanism.

For use with the above mechanism, we provide the following parts which are novel in themselves, in their control, and in the combinations wherein they are used:

In addition to the above-mentioned movable gate section, we provide a movable edge-guiding gate member which cooperates with both the fixed and movable gate sections and engages an edge of the film in order to position it in correct relation with the film. This novel member is operated in proper timed and sequential relation to other operable parts including the movable gate section and a light-trap which is positioned upon a magazine.

It is desirable that a section of the film in a magazine which makes contact with film engaging parts of a camera be protected from light when the magazine is outside of the camera and such protection automatically withdrawn when the magazine is in operative position within the camera. It is necessary, however, that the positioning of a protective device be such that it does not conflict with other parts and that all associated operable parts are operated in desired and necessary timed relation. We accomplish these results.

Our invention also includes a meter which registers the amount of film which has been exposed (or remains to be exposed) both in a particular photographic undertaking and also upon each separate magazine which is used. These devices and those for protecting a film from unwanted light are preferably operated in close association. We provide one meter upon each magazine. A second footage recording device upon the outside of the apparatus shows both the amount of film which has been exposed during an entire photographic operation which may involve the use, in whole or in part, of the film which is housed within a plurality of separate magazines, and that which has been exposed within a magazine which is currently employed. Since such a meter upon the magazine cooperates with a meter upon the apparatus, it necessarily contains cooperating parts which are exposed when the two meters are operated concomitantly. In order that the correct reading of the meter upon the magazine is not changed inadvertently while the magazine is out of the apparatus, we provide means which at this time either covers this exposed mechanism or alternatively locks the meter of the magazine.

We also show herein novel means for locking a delivery mass of film in a magazine against unwanted unwinding, and show and claim novel means for controlling such a lock, preferably but not necessarily in close association with the operation of the above mentioned light-trap and automatically operable parts of our footage recording devices.

In order that a double exposure of a film can be made when desired, we provide novel mechanism to back-wind the film through the apparatus through a feeding channel which is clear of interference from a tooth of either a pull-down or a positioning claw and also to block the normal forward operation of the apparatus during this back-winding operation.

At the conclusion of the back-winding operation and at other times prior to the beginning of a feeding operation, we provide novel means which automatically frame the film—that is, place a picture receiving surface in alignment with the aperture and a perforation in alignment with a claw or the claws.

Among the important objects of this invention is the provision of novel and effective mechanism which accomplishes the above results among others, as will more fully appear from the subsequent introductory portion of this specification, the detailed description which follows, and the attached drawings.

The above operable parts, many of which are in themselves novel, are used in novel combinations and controlled in a novel manner. Parts which make up a first of these groups are operated by our novel main control mechanism and those which make up a second are actuated by our novel movement control mechanism.

The main control mechanism is actuated by a final portion of the closing and opening movements respectively of a cover for a film compartment of a camera. It operates the following parts in the necessary timed and sequential relation:

Gate:
  Movable section.
  Edge guide.
Light trap for magazine.
Lock or protection for film meter.
Lock for delivery mass.
Device for automatically framing a film.

Our movement control mechanism is actuated by a single control member which is manually movable between five stations as follows:

Threading (S3)
Normal exposing (S1)
Locked exposing (S5)
Single picture exposing (S2)
Back-winding (S4)

In addition, the main control mechanism is interlocked with the movement control mechanism in a novel manner to control and safeguard its operation.

From the above fragmentary outline, we proceed to a general description of certain of the parts, elements and combinations of our invention and then to their detailed description.

Gate members and a light-trap for a magazine are closely associated and their control must be joint.

In order that a film may be held at the aperture within very close limits in the focal plane of the lens, it is necessary that a fixed gate section protrude inwardly or away from the lens into a compartment in which a magazine is to be positioned. The face of this member lies exactly in and determines the focal plane of the lens. It is also necessary or at least highly desirable that the film be positively maintained against movement in a direction normal to the optical axis of the apparatus by members which engage and guide its edges. One of such edge guides preferably is disposed upon the magazine and another upon the apparatus in the manner described and broadly claimed in the patent to Morsbach, Number 1,937,354, dated November 28, 1933, but both edge guides may be upon the magazine or upon the apparatus. These guides may be fixed or movable, or one may be fixed and another movable, depending upon the characteristics of the apparatus and magazine in question. In any case, a gate member must be movable between a position spaced from the film then bridging the recess which receives the movable gate section and another in which it engages the film and presses it against the fixed gate member, thus closing the gate.

In magazines of this type which are adapted for use with a camera and hence house light-sensitive film, it is desirable to provide a light-trap for that section of the film which extends across a gate receiving recess of a magazine. This light-trap, however, must be moved from protective to running position before the gate is closed. An important object of this invention is to provide an improved light-trap in combination with a camera and improved means for moving it from a protective position across the gate receiving recess to a running or operating position within the magazine whereby the film is left free for engagement by the movable gate section. It should be understood, however, that it is necessary that this light-trap be moved from protective position before the movable gate section is moved relatively far toward the film. Unless such sequential movement is provided, conflict and an inoperative structure result.

Since the fixed gate section projects within the film receiving compartment of the camera and slightly within the gate receiving recess of the magazine when it is positioned therein, it is desirable to supply a light-trap for the magazine which is so disposed that it does not engage this gate section as the magazine is initially placed within the camera. At this time, of course, the light-trap is in protective position bridging the recess. Any effective light-trap, considered as a whole, must extend in all directions from the film which it protects. Therefore, since the light-trap when in protective position is initially placed away from the fixed gate section, the film, at that stage, is likewise disposed out of its running position and spaced from the fixed gate section. It is then necessary, preferably by automatic means, to make it possible that as the film is freed from the light-trap and the light-trap is moved from the recess, the film be brought to its running position adjacent the fixed gate section. Also, the film must be thus freed for movement before the movable gate section is moved from threading to running position.

The present invention provides an improved light-trap which is operated in the sequential manner above indicated. One of the important objects of this invention is the provision of a light-trap of a magazine so disposed and sequentially controlled that while in its protective position it is positioned (when the magazine is within its compartment within a camera) across the gate receiving recess of the magazine and out of contact with a fixed gate section of the camera with the film therewithin out of operating position and while in its running position it is positioned out of the gate receiving recess with the portion of the film previously protected thereby freed therefrom and accessible to engagement by a movable gate section which thereupon brings the film into contact with the fixed gate section.

In the above respects and others, this invention is an improvement upon the co-pending application of the junior applicant herein Serial Number 536,128, filed May 18, 1944, the presentation of such improvements being an important object hereof.

As previously indicated, it is desirable that the edges of the film be guided. In the present invention, we provide one edge guide disposed upon the magazine and another edge guide disposed upon the apparatus. Since the light-trapping structure which we prefer to use must extend upon all sides of the film, it is desirable that one of these edge guides be maintained away from film engaging position until the light-trap has been moved from the protective to the running position. An important object of this invention is to provide such a movable light-trap and the means for moving it in desired or necessary timed relation to the actuation of an edge guide as well as other operable parts of the apparatus, particularly those associated with the film at the gate.

An object of this application is to present improvements in this respect upon the said co-pending application of the junior applicant Serial Number 536,128 in which operable edge-guiding means and the sequential movement thereof are provided by the light-trap itself as contained within the magazine.

In magazines of this type, as shown in the said Morsbach Patent Number 2,175,538, it is desirable in many cases to place the delivery mass upon a floating spindle so that, at least in the earlier period of a film exposing operation when it is largest, it rests upon and in part is driven by the take-up mass with which it is associated. Thus the powered revolution of the take-up mass assists the traction of the film in starting and maintaining the movement of the delivery mass. It is desirable in a magazine, however, that the delivery mass be locked against unwinding when the magazine is out of the apparatus. An object of the present invention is to provide improved locking means adapted, if desired, to a floating spindle which are made operative in timed relation to the placing of the magazine in operative relation to the camera and made operative in timed relation to its removal therefrom. Such means may be operated by a mere act of placing the magazine in running relation to a camera, but we may prefer that it be operated positively by the general control mechanism of the apparatus. We may also prefer that this operation be immediately interlocked with movement of a light-trap.

Before describing other important phases of our invention, it is necessary to present one additional reason why it is highly desirable for a camera to be so constructed that it will alternatively accommodate a film housed within a magazine or supported upon open reels.

As is well known in the art, amateur films are made in several widths, those of present commercial importance in the United States being of sixteen millimeters and eight millimeters. Sixteen millimeter film is exposed and projected in that width. Among the films which have been widely sold on open reels for amateur use is the so-called "double eight." When this film is sold for use within a camera it is sixteen millimeters in width and has one row of perforations adjacent each edge. Thereupon two parallel series of pictures running in different directions are successively exposed. The film is then processed and split and turned end to end and joined by the manufacturer into one of eight millimeters in width and having only one longitudinal series of stable and visible pictures and a single row of perforations and is so projected by the user. One reason for the introduction of the "double eight" has been the ease of loading and manipulating in a camera a film of sixteen millimeters in width in comparison with one of half that width. It will be understood, however, that in order to expose the entire portion of such a film the user must thread it twice. He first threads it and exposes one series of longitudinal pictures occupying one-half of the available surface. He then opens his camera, removes the take-up reel from the take-up spindle, turns it over, again places it on the delivery spindle, and re-threads the film through the camera with the previously unexposed portion in position for exposure so that he may photograph another longitudinal series of pictures adjacent the first.

A film of only eight millimeters in width known as a "single eight" is generally considered to be too small to be easily manipulated by an amateur, particularly for threading within a camera. If a "single eight" film merely eight millimeters in width is housed within a magazine and that magazine used in an apparatus such as that of the parent patent or of this application, however, these difficulties of threading and handling are completely overcome, and the user in order to expose a full length of such film merely drops the magazine into place, closes the cover and proceeds with his photography. All of the trouble for the amateur of handling a film of extremely narrow width is avoided as well as the necessity for stopping the photography in mid-length and re-threading. The initial threading of a "single eight" within a magazine presents no difficulty to the skilled employees of the manufacturer who, of course, may be supplied with all necessary assistance such as fixtures. While a "single eight" film carried by an open reel has proved impracticable for use in a camera, a "single eight" film in a magazine is welcomed by the user. The objection to such a magazine, however, is that for commercial reasons it may not be everywhere obtainable and certain manufacturers may withhold some types of their films from it, although films of all common types wound upon the "double eight" open reels may be purchased anywhere.

Another and primary object of the parent invention, therefore, is to provide apparatus which will interchangeably accommodate a "double eight" film upon open reels and a "single eight" film in a magazine. Another and primary object of this application is to present improvements and refinements upon this phase of the parent patent, particularly, but not exclusively, in connection with moving and registering the lengths of film used (or remaining to be used), such films differing in width or other characteristics or being supported by carriers of different characteristics or differing in both of such respects.

Throughout this specification and in the appended claims the terms "double eight" and "single eight" are to be taken as generic and not specific. That is to say, a "double eight" film is to be taken as one of relatively great width, irrespective of any specific measurement, which may be cut into a plurality of smaller ribbons to form a "single eight" film which is one of relatively small width, irrespective of any specific measurement. It will also be understood that since magazines and apparatus as described herein are designed to expose or project films of this relatively small width and conventional projecting machines are now designed to accommodate a "single eight," this term is used broadly to include films which may have been originally exposed or printed as a single film of this or other lesser width. It is also to be understood that an important object of the parent invention is to supply an apparatus which will accommodate films of different widths, other than the "double eight" and "single eight." For example, the constructions which are described and claimed therein may be advantageously employed in apparatus in which the user may expose project or print films of different fixed widths such for example as those which are both exposed and projected as sixteen millimeters in width, eight millimeters, or nine and one-half millimeters, the latter being a standard which while still used extensively in Europe is not now widely commercially employed within the United States. Also these constructions may be advantageously employed with films differing in respect of other characteristics such, for example, as sound and pictorial films, pictorial films, or sound films, or films having different arrangements of perforations. The structure claimed herein cooperates with such films in the particular respects which will be clear from later portions of this specification.

A photographer must know how much film he has exposed (or how much remains to be exposed). When films of two different widths or other characteristics are alternatively exposed, or films one of which is in a magazine and one of which is upon open reels, he should know the entire length exposed (or remaining) and that exposed (or remaining) upon each carrier. It is particularly important that when a magazine is removed from a camera only partially used that magazine, as well as the camera, carry a record of the film footage. To provide novel mechanism which accomplishes such ends is also an object of this invention.

A meter disposed upon a magazine will, of course, be invisible when the magazine is enclosed within a camera. We therefore mount a film recording device upon an exterior portion of the camera but operate it in accordance with the operation of the meter upon the magazine. We may prefer a meter upon the camera which has two dials, both operated in accordance with the amount of film which is being exposed by the camera, but one of which may be set to indicate the amount of film which is exposed within each individual magazine and the other of which may be set to record the amount of film which is fed in any particular photographic enterprise which may make use of a plurality of magazines or of films of different widths or other characteristics. Alternatively, we may prefer to provide two meters, one upon each magazine and one upon the camera, the meter upon the camera being automatically set to agree with the meter upon whatever magazine is in current use.

To accomplish the above ends, we may provide a film engaging device carried by a magazine which when that magazine is disposed in a camera operates a meter carried thereby and a film engaging device carried by the camera which operates its meter when the magazine is not disposed therein. In such instances as a single eight film is housed within the magazine and a double eight supported by open reels is used alternatively, one device will be actuated by the single eight and the other by the double eight but each device will alternatively operate the meter carried by the camera. A film engaging member of a magazine may operate its own meter which in turn operates a meter of a camera. A film engaging member of a camera may operate its own meter which in turn operates a meter upon a magazine, as, for example only, when films of the same width but one housed within a magazine and the other supported by open reels are employed. Each of the above arrangements is particularly well adapted to particular combinations of carriers and films.

It is also desirable and among our objects that a film recording device for a magazine, once the magazine is removed from the apparatus, be rendered inaccessible to the fingers of a careless user, or positively locked so that the footage thus recorded will not be changed, thus giving an erroneous reading, and, alternatively, that when the magazine is reinstated in the camera, the meter is again rendered operable. We provide means for accomplishing such results, preferably in timed and sequential relation to the actuation of other operable parts of the apparatus. We may prefer to carry out these operations in close association with the operation of a light-trap of a magazine.

We provide mechanism whereby the dials of the meters disposed upon a camera may be set back to a zero position (or forwardly to a maximum position) each time a fresh film is inserted.

Among the important objects of our invention is the provision of film recording devices or meters having the above and other desirable characteristics.

In order that certain photographic results may be obtained, it is desirable to provide means whereby a film may be back-wound after it has been exposed, so that a certain section of it may be reexposed. An important object of this invention is to provide improved means whereby such a back-winding operation may be carried out. As a part of our invention, we apply such means both to spindles adapted to support open reels and magazines, whether the magazines have floating or axially fixed delivery masses. To ensure proper operation of a camera, however, it is desirable and among the objects of our invention to prevent a careless operator from causing conflict by inadvertently attempting to back-wind a film while a regular exposing operation is being carried on. It is also desirable, and among our objects, to free the film channel from the teeth of all members while the back-winding operation is being carried out.

Another object of our invention is to provide footage recording devices which satisfactorily cooperate with a back-winding mechanism.

After a back-winding operation and, in fact, when any exposing operation is begun, it is desirable that the film be "in frame"—that is to say, that each individual picture receiving surface of the film be directly aligned with the aperture at the gate and that the perforations which are to receive either a positioning or a moving finger be aligned therewith. In the claims hereof, we use the word "frame" or "to frame" in the sense defined hereinabove. An object of this invention is to provide means which automatically accomplish this end. We may prefer to operate such mechanism in close association with our improved light-trap and its control.

In common with all other highly developed film handling apparatus, it is necessary to start and stop a regular exposing operation and to expose only one picture or frame. It is also desirable to lock such a control mechanism in exposing position, so that the film feeding mechanism will run indefinitely. Such a control also should free the film path for back-winding to prevent possible conflict between a back-winding and an exposing operation. To this end we provide a "movement control mechanism," which in many of its aspects is novel.

As will have been understood from the previous portions of this specification, we provide a highly developed and novel "main control mechanism" which both supervises, as it were, and controls the operation of the movement control mechanism and also operates the movable gate member, edge guide, light-trap, means for locking and unlocking the meter upon a magazine or otherwise preventing tampering with it, film framing means and, in one embodiment, means for locking a delivery mass from unwanted unwinding. This main control mechanism is actuated by a final portion of a cover closing operation and by an initial portion of a cover opening operation. Among the other important objects of the present invention is the provision of such main and movement controls and an inter-locking relation therebetween.

As will be clear from the foregoing portion of this introductory section of our specification, among the important objects of the invention is application of its respective elements alone and in combination to apparatus which accommodates films of different widths or carriers of different characteristics or both thereof. An equally important object, however, is the application of such elements alone and in combination to film handling apparatus of the type wherein film of only one width may be fed or a carrier of one type accommodated.

We illustrate our invention as applied to highly developed apparatus and magazines the operation of which is largely automatic. We wish it distinctly understood, however, that the respective elements and many of their combinations and subcombinations are equally well adapted for use in apparatus or with magazines which are less highly developed. Such applications of the subject matter of this invention are numbered among its important objects.

Among the objects of this invention is the provision of the mechanisms and combinations thereof which we have stated above. Other objects, advantages and characteristics will be evident from the following portion of this specification, the accompanying drawings and the subjoined claims. Although we are showing preferred forms only of our invention for purposes of illustration, it will be understood that changes can readily be made without departing from the scope of our broader claims or the spirit of our invention.

For convenience, in the attached drawings, and the description thereof which follows, a magazine and camera, which are shown to illustrate our invention, except as noted are positioned and described from the point of view of their disposition in a picture-taking position. That is to say, the words "front" or "forward" and the like are applied to the portions of the camera which bear the lens, and "back" and the like to the opposite side. Correspondingly, except as specifically noted, the words "left" and "right" and their derivatives are applied to the camera as it is held by the user in picture-taking position. Similarly, parts of a magazine illustrated and described for use with this camera or otherwise are designated as in picture-taking position within a camera held as stated above. The words "above" and "below" and their derivatives, except as noted, are applied to certain parts in relation to a plane parallel to the right and left sides of the camera as above defined.

In the drawings:

Figures 1 and 2, which should be jointly considered, are isometric views respectively of a film-handling apparatus and a magazine for use therewith. In Figure 1, certain parts are broken away.

Figure 3 is a vertical section of a magazine for use with the apparatus hereof or otherwise. It shows our improved automatic light-trapping means in open or film-handling position as when the magazine is within a camera, and, in respect of light-trapping, represents an improvement over the structure of Figure 2.

Figure 4 is a section of the gate-receiving recess of Figure 3 but showing our improved automatic light-trapping means in light-tight position as when the magazine is without the camera.

Figure 5 is a front elevation of the magazine of Figures 3 and 4, with certain parts broken away.

Figure 6 is a detail of a latch for the light trap of Figures 3, 4 and 5.

Figure 7 is a top plan view, partially in section and with certain parts broken away, which corresponds to Figure 3; it also shows a film meter mounted upon a magazine, together with its driving and controlling instrumentalities, including an operating link associated with our improved light trap.

Figure 8 is a section taken on the line 8—8 of Figure 7 and looking in the direction of the arrows.

Figure 9 is a section in the line 9—9 of Figure 7 and looking in the direction of the arrows.

Figure 10 is an enlarged and detailed view in perspective, with certain parts broken away, illustrating a delivery core for a film magazine.

Figure 12:
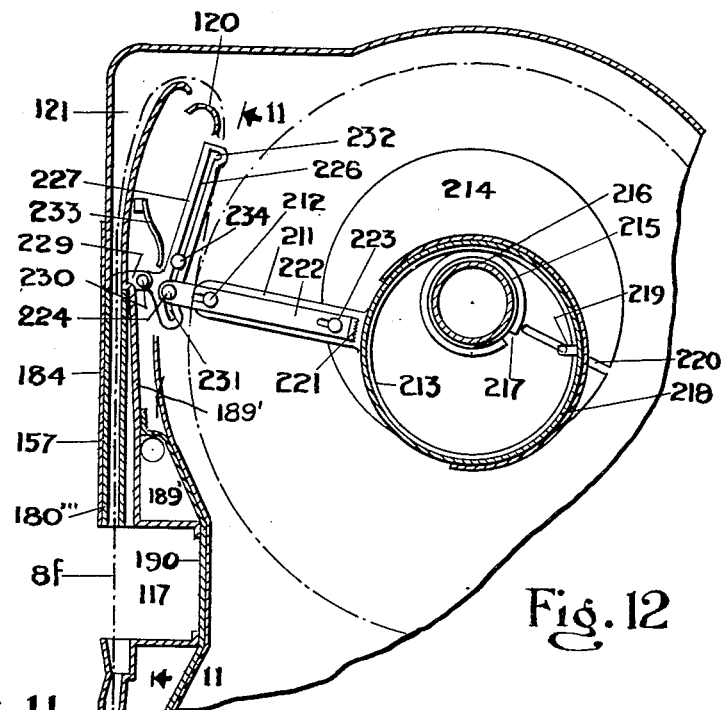
Figure 12 is a vertical section of the subject matter of Figure 11 and likewise showing the parts in film exposing position with the delivery core unlocked.
Figure 13:
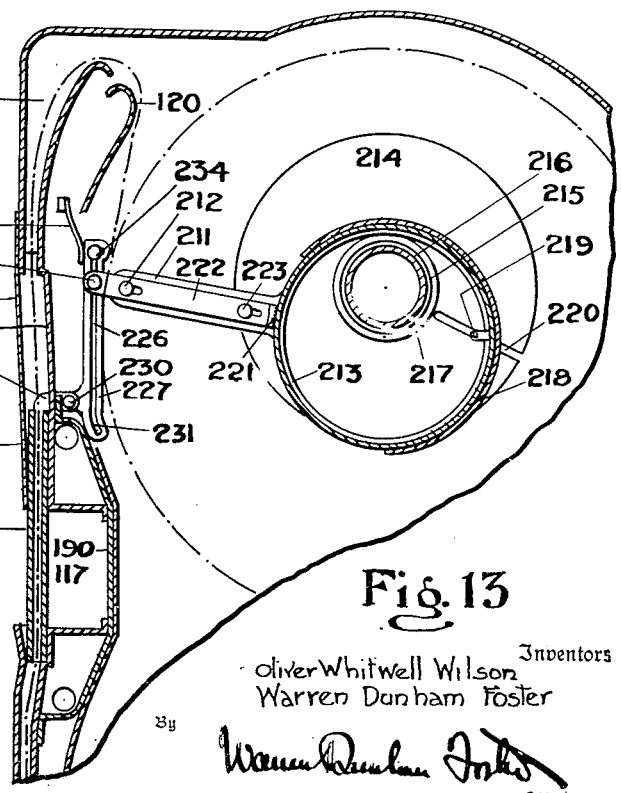

Figure 13 corresponds to Figure 12 but shows the magazine in light-trapping condition with the delivery core locked.

Figures 14, 15:
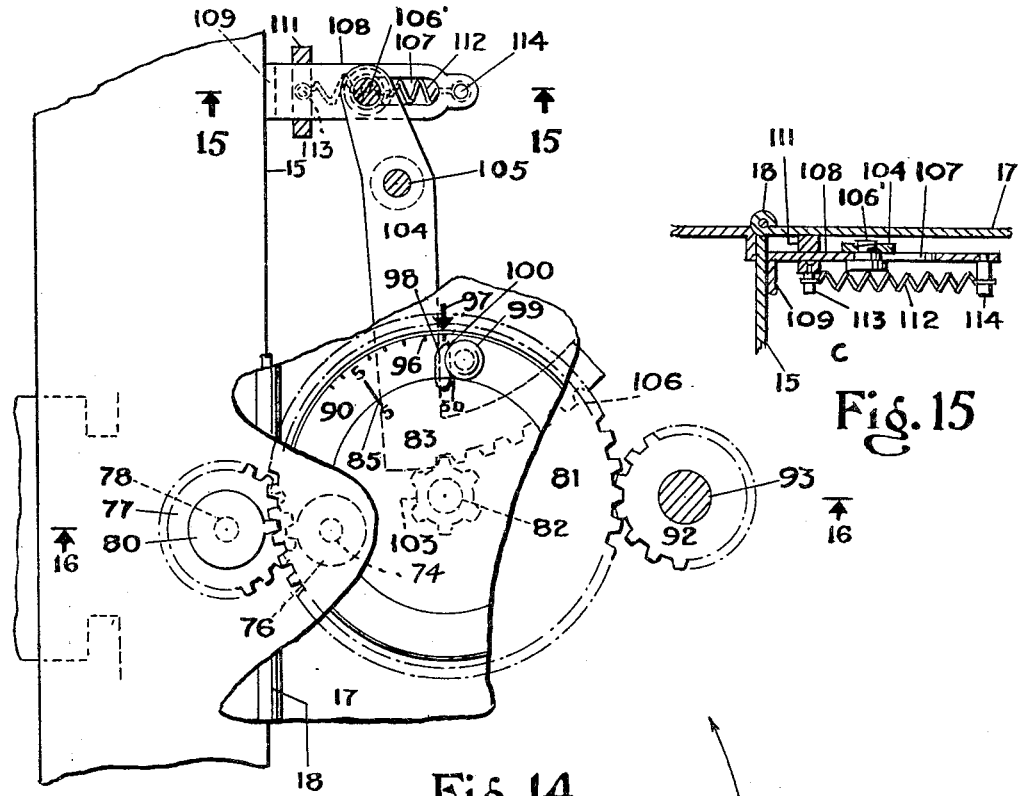

Figure 14 is a top plan view partially broken away and partially in section showing a cover for film handling apparatus and film-metering devices associated therewith.

Figure 15 is a section taken on the line 15—15 of Figure 14 and looking in the direction of the arrows.

Figure 16:
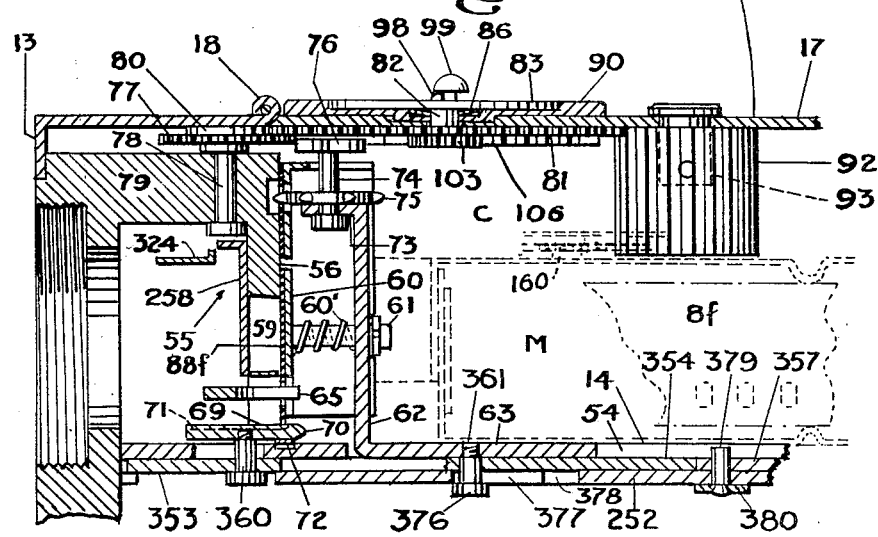

Figure 16 is a view partially in plan and partially in section taken on the line 16—16 of Figure 14 and looking in the direction of the arrows.

Figures 17, 18:
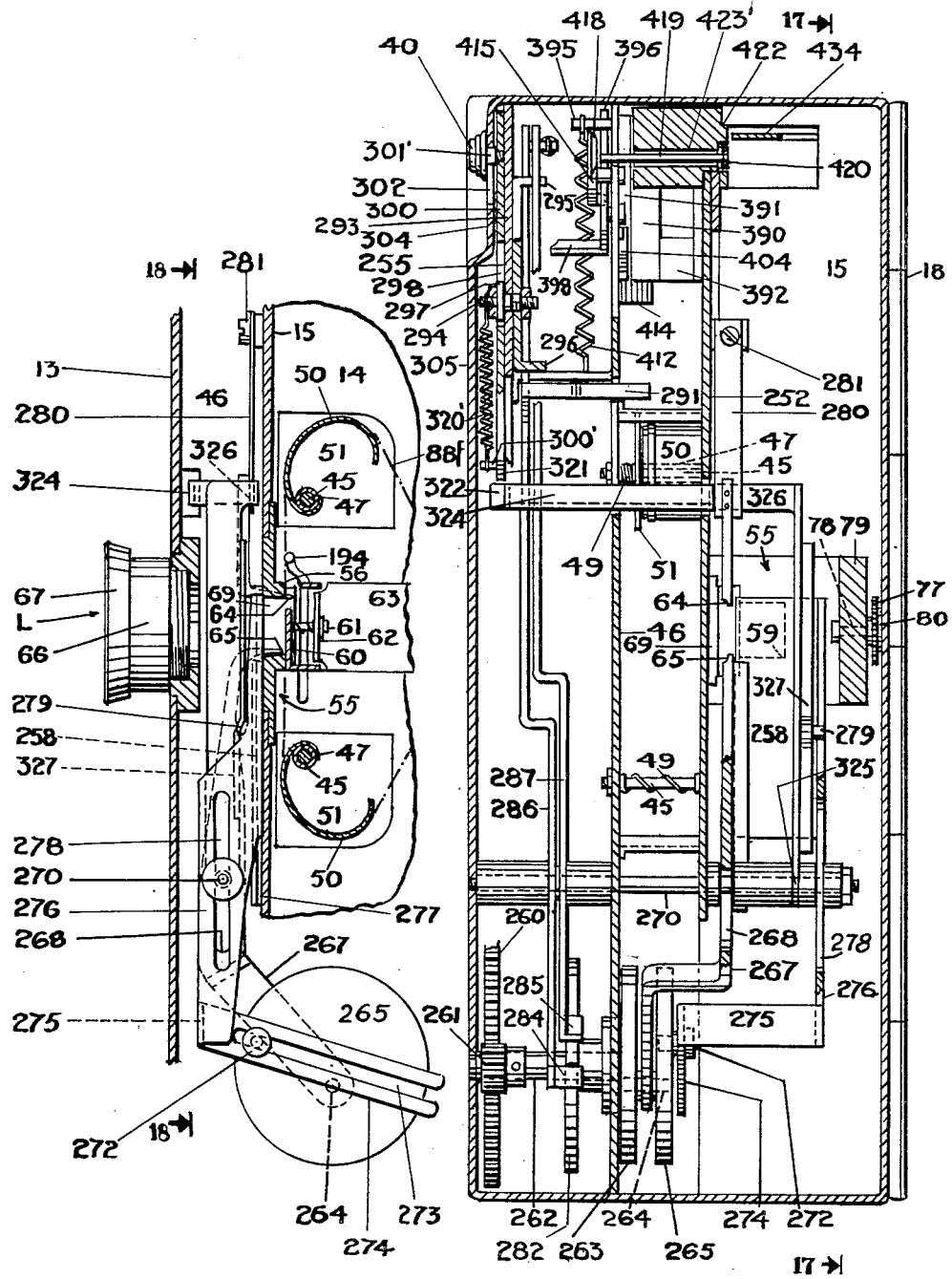

Figure 17 is an enlarged vertical section taken on the line 17—17 of Figure 18 and illustrating film moving and positioning mechanism, together with control therefor, certain parts needed for a film upon open reels but depressible out of a film compartment upon the insertion of a magazine therein, and control for the above mechanism.

Figure 18 is an enlarged section taken on the line 18—18 of Figure 17 and looking in the direction of the arrows.

Figure 19 is a vertical section with certain parts broken away illustrating control mechanism for the driving and positioning means of Figures 17 and 18 and for the back-winding mechanism of Figures 19, 22 and 32.

Figure 20 is a fragmentary bottom plan view of the upper right portion of the camera and corresponding to that portion of Figure 19 and showing the stations to which a control button which operates the structure of Figure 19 may be moved.

Figure 21 is an enlarged section taken on the line 21—21 of Figure 19 and looking in the direction of the arrows.

Figure 26:
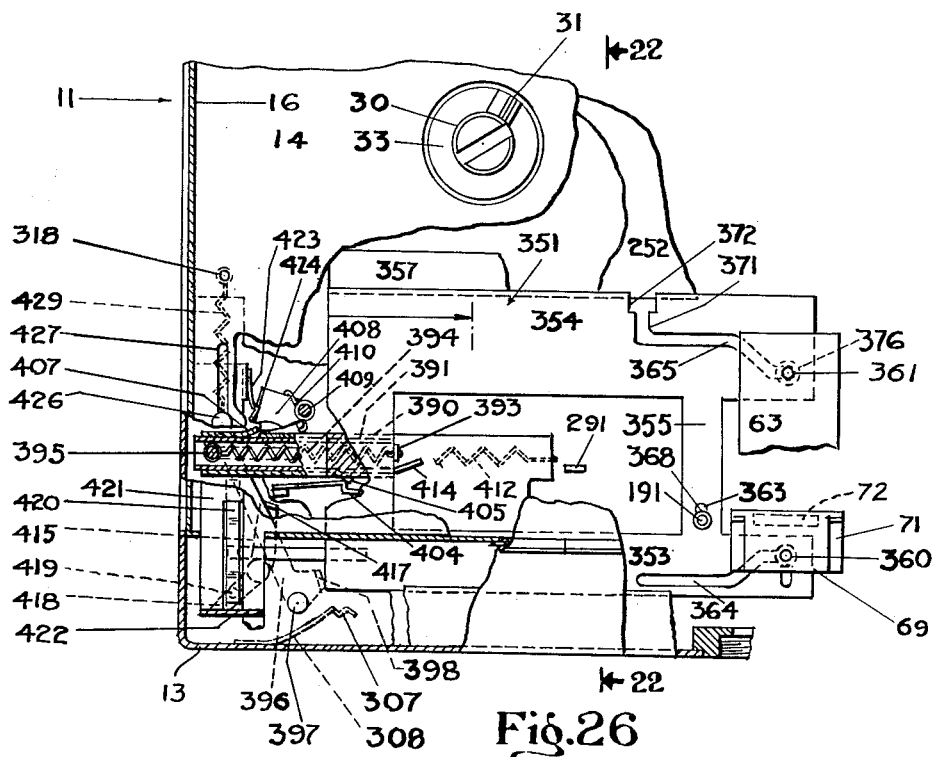

Figure 22 is a view largely in section taken on the line 22—22 of Figure 26 and looking in the direction of the arrows and illustrating both control mechanisms as well as the back-winding control.

Figure 23:
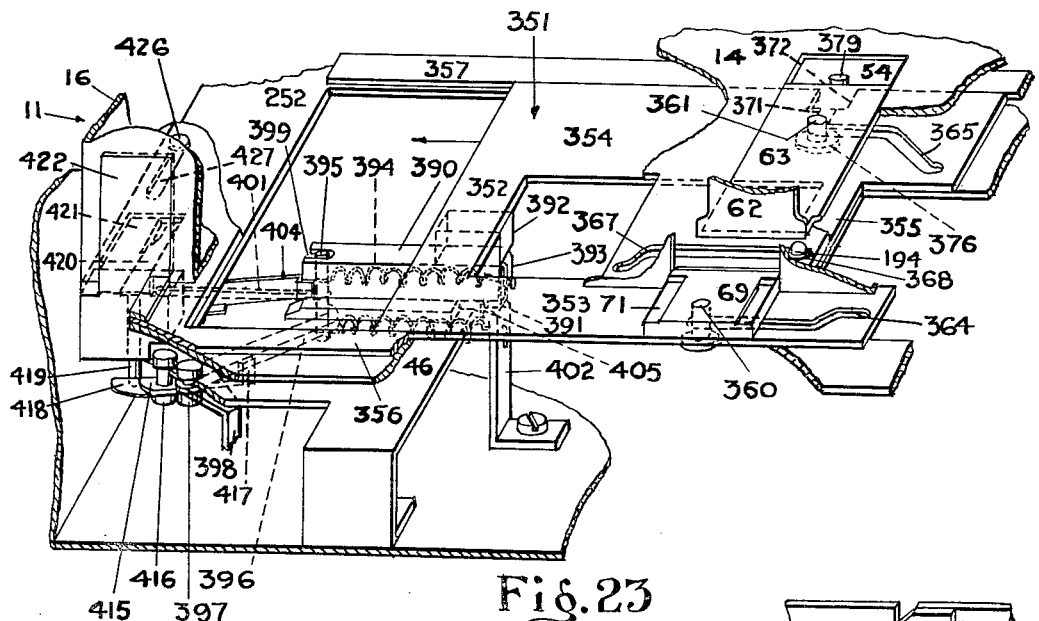
Figure 24:
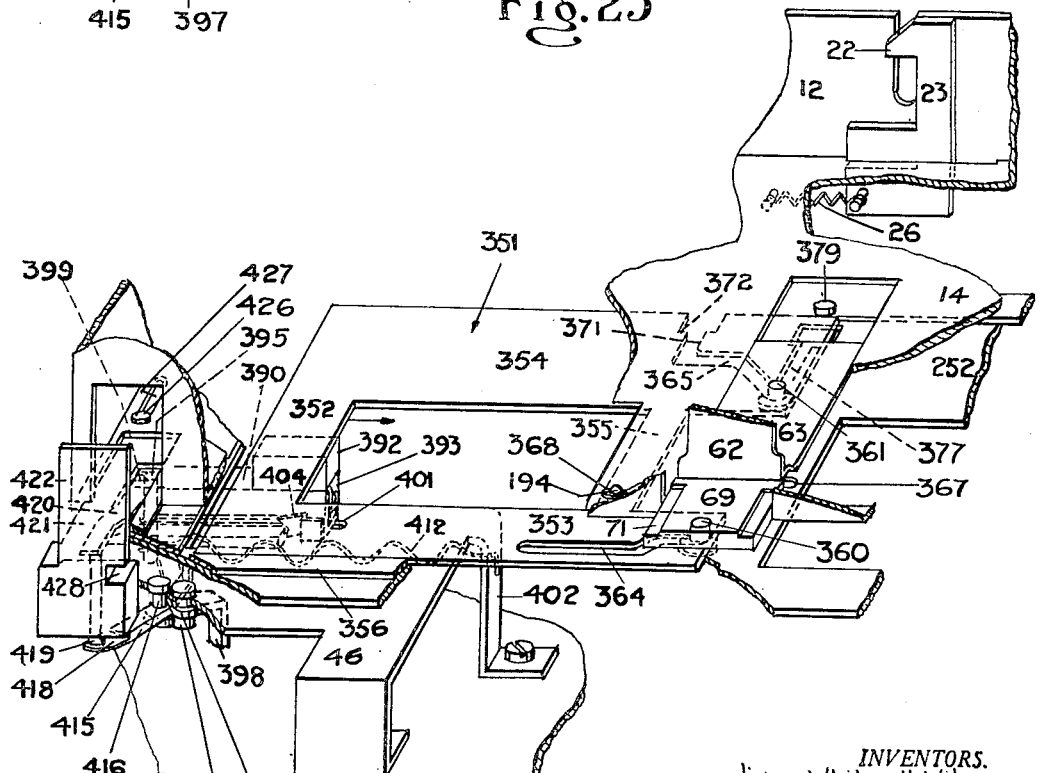

Figures 23 and 24, which should be considered together, are fragmentary isometric views, with certain parts broken away, looking from the front of the camera and showing main control means, under the influence of movement of a cover of a film compartment of a camera, for a movable gate section, a lower film edge guide, and a positioning claw, and for a light trap and meter of a magazine placed within the compartment. Figure 23 shows the above and other parts in the position which they occupy when the cover of the film receiving compartment is open and in a threading position for the reception of a film magazine or, alternatively, a film supported upon an open reel. Figure 24 shows the same parts in the positions to which they are moved by the closing of the cover ready for the exposure of the film.

Figure 25:
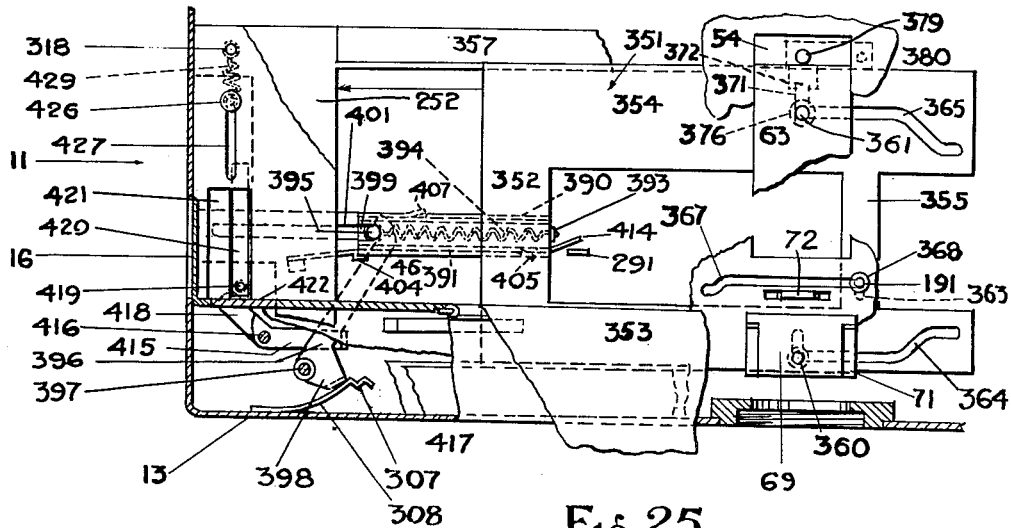

Figures 25 and 26, which should be considered together, are views partially in top plan and partially in section illustrating the control mechanism for certain of the operable parts of the apparatus. Figure 25 corresponds to Figure 23 and shows these parts when the cover of the film compartment is open for the reception of a magazine or, alternatively, an open reel; and Figure 26, which corresponds to Figure 24, shows the same instrumentalities after the cover of the film compartment is in closed and in light-tight relation. Certain parts are omitted for clarity.

Figure 27 is a fragmentary sectional view corresponding to Figure 16 but showing a modification of a construction of a meter which is adapted for use with a magazine which houses a film of the same width as that which is used upon open reels.

Figures 28 and 29 are views showing a modification of this invention by means of which a magazine when inserted in a camera automatically makes a meter which is mounted upon the apparatus correspond to a record which is shown upon a meter which is mounted upon a magazine. Figure 28 is a fragmentary top plan view corresponding to Figure 14 and showing a meter of this type mounted upon a camera and means for setting this meter by the meter of Figure 29. Figure 29 is a top plan view corresponding to Figure 16 and showing a meter of this type mounted upon a magazine.

Figure 30 is a fragmentary top plan view partially in section and partially broken away and corresponding to Figure 7 but showing a modification of our invention in which a meter indicating the length of film exposed within a magazine is locked except when the magazine is disposed within a camera the parts of which are in running position.

Figure 31:
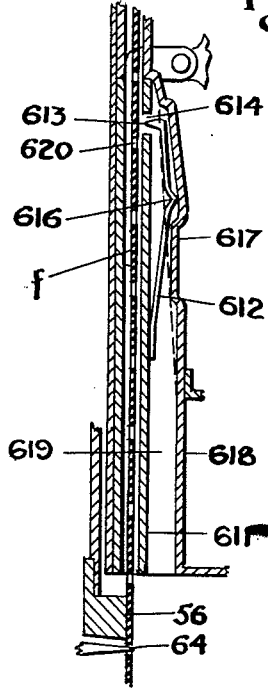

Figure 31 (sheet 4) shown a construction wherein a film is accurately and positively framed prior to the starting of operation of a film handling apparatus.

Figure 32 (sheet 3) is a fragmentary sectional view showing a back-winding handle.

The above statements as to the content of the various figures are to be taken as merely indicating certain of the significant parts shown in the respective drawings. They are not intended as comprehensive.

We illustrate our invention as applied to a film handling apparatus, in this instance a camera, having many of the characteristics of the camera of our said parent Patent Number 2,351,088. This camera may consist essentially of a substantially quadrilateral outer casing 11 having a back wall 12 and a front wall 13 and embodying a film compartment C with a floor 14, a front wall 15 and a top flanged wall 16. A cover 17 is hinged at 18 and has a top rim 19 which when the cover is closed co-acts with the top wall or rim 16 of film compartment C. Either a magazine or open reels may be housed within the compartment. To hold the cover in close and light-tight relation to the film compartment, a latch is provided. A button 21 mounted on cover 17 engages a detent 22 which is mounted upon the back wall of the apparatus and is movable under the influence of an arm 23 operable by a button 24 working in a light-trapped recess 25 in rear wall 12 of the magazine casing. A spring 26 tends to force the detent into locking position. See Figure 24. A latch-lock of the sort described and claimed in our said co-pending parent patent may also be provided if desired, under the control of a luminous disc 28 shown in Figure 1 in dashed lines. The purpose of such latch-lock is to prevent the inadvertent opening of the film compartment when a film positioned upon open reels but not completely wound upon one thereof is positioned therewithin. Also, as shown in our said co-pending parent patent, we prefer to provide an observation opening 29 for an enclosed sighting tube, not shown.

As previously stated, the film compartment is adapted for alternative use with a film housed within a magazine or disposed upon an open reel. In either case, we prefer to provide means whereby the film may be back-wound from a take-up mass to a delivery mass for the purpose, for example only, of making double exposures.

A delivery spindle 30 having an upstanding driving lug 31, the top portion of which is wedge-shaped, is mounted upon a plate 32 which is either freely revoluble when a film is being advanced in a normal exposing direction or revoluble in a rewinding direction when the film is being back-wound. In order that a user may back-wind the film, a slot 33 is formed in the upper end of spindle 30 for co-action with a cross lug 34 which is preferably formed as a portion of a shaft 35 which, as shown in Figure 32 (sheet 3), extends outwardly from cover 17, and is mounted for revolution therewith. A housing 36 enclosed a spring 37 which by co-action between the cover and the under side of knob 39 attached to or a part of the housing normally forces this structure upwardly and out of engagement with spindle 30. When the user wishes to back-wind the film by use of a knob 39, he first forces it and lug 34 downwardly and into driving engagement with slot 33 and thereafter revolves it to back-wind the film. Normally, however, the delivery reel is blocked against revolution in a direction contrary to that necessary for the exposing of the film. To free the delivery spindle for back-winding, a user moves control button 40 to station S—4, as best shown in Figure 20.

As will later appear, this control button is movable between each of five control stations for the purposes indicated below:

S—1: Exposing or running;
S—2: Single picture;
S—3: Threading;
S—4: Back-winding;
S—5: Locked-exposing.

It will be understood, as this description proceeds, that the movement of the control button to such stations as indicated above disposes operable parts of the apparatus so that the indicated operation is or may be automatically carried out.

As will later be described in detail, such movement of the control button to station S—5 is effective for moving a positioning finger 64 which co-operates with the pull-down claw from contact with the film as well as freeing the delivery spindle for back-winding. Thereupon the film may be moved freely from the take-up back to the delivery mass. Since forward or exposing operation of the apparatus is impossible until control button 40 has been moved from this back-winding station S—5 to station S—1, no conflict can take place, all as will later be described in connection with the details of this control structure.

Corresponding to delivery spindle 30, above described, is a take-up spindle 41 having a driving lug 42. This delivery spindle is frictionally driven in any desired or conventional manner, or as shown in our said parent patent. Since the means for driving whatever slip-clutch is employed forms no part of the present invention, they are not illustrated or described.

Figures 1, 2, 2A:
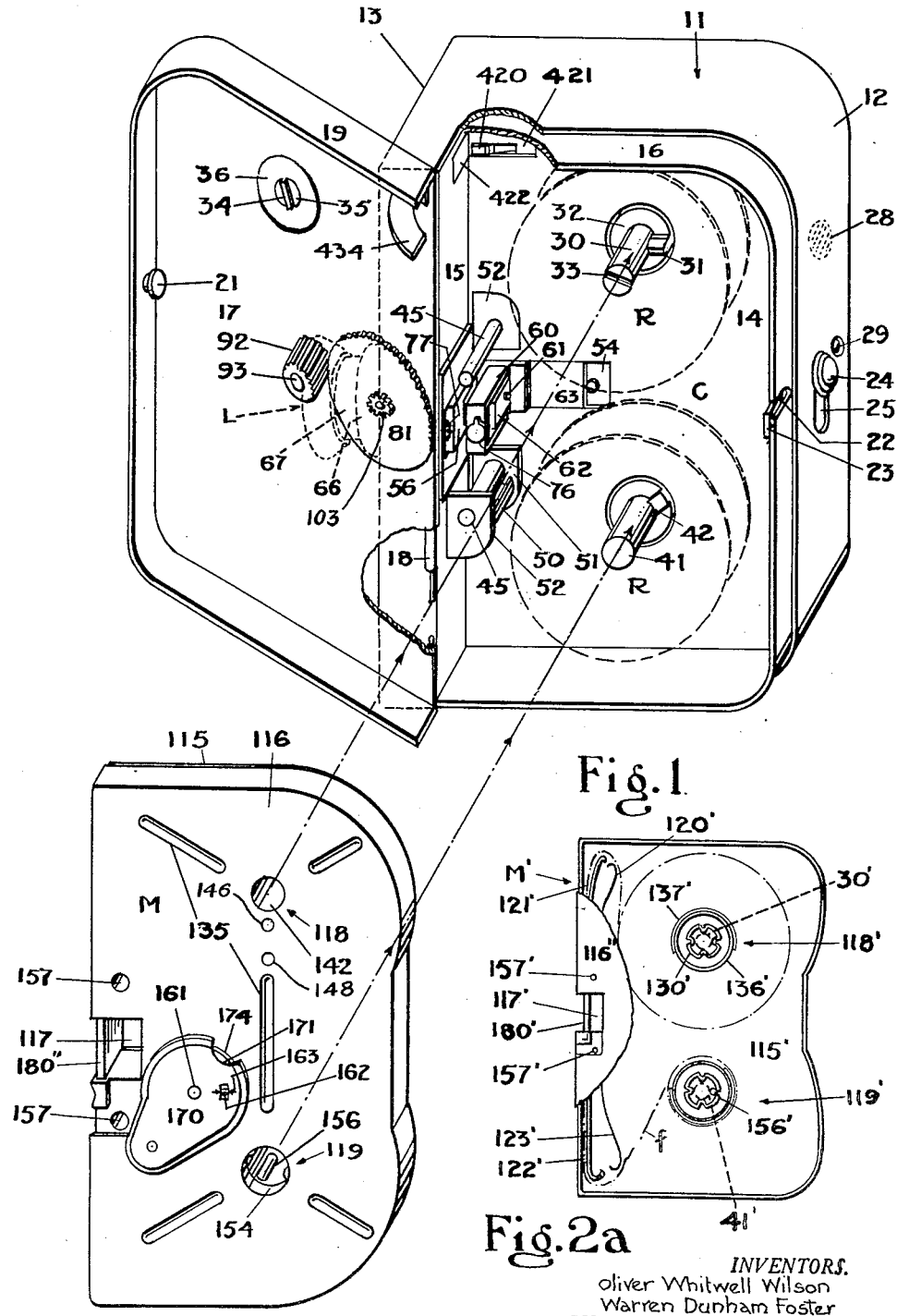
Figure 2a shows a magazine which is a variant of the structure of Figure 3.

As was previously stated, a film positioned either upon open reels R, shown in dotted and dashed lines in Figure 1, or housed in our magazine M, or in variants thereof, as shown in Figure 2 and others, may be alternatively employed within film compartment C. In either instance for satisfactory photography, as previously stated, compensation must be provided for the difference in character of movement between the intermittently moving section of a film at the gate and exposure aperture and its continuously advancing portions included within the delivery and take-up masses. We prefer to make use of the Bundick and Proctor tension control system of feeding, but as is made clear in our said copending parent patent, we may employ unsupported loops of slack film which are maintained by continuously rotating sprockets. In the present application, we show such compensation in accordance with the said Bundick and Proctor system, as disclosed and broadly claimed in Patent Number 1,944,022, issued January 16, 1934. According to this system, compensation for this difference in the character of movement is provided by the application of carefully regulated resilient pressure between the continuously moving masses upon the delivery and take-up carriers respectively and the section of the film which moves intermittently at the gate. The magnitude and frequency of this force is so calculated that tensioning pressure is applied in step with the intermittent movement at the aperture. As a result the entire mass of film is maintained under continuous tension and except at the aperture moves continuously but at varying rates of speed. Instrumentalities which apply this compensating effect to the film also act as guides for it.

The system of compensation which has been displaced by the Bundick and Proctor system is that of continuously rotating delivery and take-up sprockets with their associated loops of slack film. A delivery sprocket continuously draws film from a mass upon a delivery support and feeds it forwardly into a loop whence it is drawn by each intermittently effective pull-down operation of the intermittent claw or sprocket which in turn intermittently delivers the section of film which has just been exposed or projected to another loop which is maintained by a continuously rotating sprocket against the holding effect of the teeth of which the take-up support continuously but yieldingly pulls.

To thread apparatus making use of this system generally it is necessary that the user carefully position the film upon each sprocket and manually and accurately preform the two loops. According to the Bundick and Proctor system, however, the user merely lays the film in a channel parts of which are formed by two smooth film engaging compensating and guiding members. The tension control members may be mounted either upon the apparatus or within the magazine. As stated above and as described and claimed in our said copending parent application and as described herein, we provide such compensating members disposed both within the apparatus and the magazine, if desired those within the apparatus being adapted for films of certain characteristics and those within the magazine being adapted for a film housed therein which has other characteristics. The placing of the magazine within the apparatus displaces the tension control members designed for a film which is supported by open reels.

Although for reasons stated above, we much prefer to use the Bundick and Proctor system, continuously rotating sprockets with their unsupported loops of slack film may be substituted, if desired, in the manner described and claimed in our copending parent patent. Such sprockets may be used both in a magazine and in a camera. Sufficient of one of such constructions is shown and described herein, however, so that one embodiment of this feature of our invention may be understood.

In Figure 1, open reels R are shown in position. For convenience, however, we have illustrated tension compensating means associated with the delivery mass as in the position which they assume when a magazine is positioned within compartment C. It will be understood, of course, that when open reels actually are positioned within the film compartment, both of these tension mechanisms are in the position in which only the take-up mechanism is shown in Figure 1.

Each of these compensating mechanisms, as will be observed from Figures 17 and 18, may consist of a fixed post 45 suitably fastened to a main vertical bearing plate 46 positioned within the interior of the casing. Sleeves 47 of the delivery and take-up units are free to slide on posts 45 and are normally held in operative position for a film mounted upon open reels by coiled springs 49.

Resilient tensioning and guiding members 50 of suitable curvature and of suitable spring material are mounted upon sleeves 47 and engage a film 88f, presumed for purposes of illustration only to be a double eight, as it passes between open reels, as indicated in Figure 1. These sleeves are free to rotate on the posts 45 and the resilient members 50 to vibrate between film edge guiding plates 51, which when a film upon an open reel is being exposed are disposed at floor 14 of the film compartment, and 52, which is disposed adjacent the cover 17. For a description of the other constructional elements of these mechanisms, reference is made to our parent patent. As a magazine M, such as that of Figure 2 or others, is placed within the compartment C, of course after the removal of the open reels, plates 52 and the other portions of the compensating mechanisms are depressed until plates 52 are positioned adjacent the floor of compartment C and plate 51 and the remainder of this tensioning mechanism is disposed within the body of the camera. Magazine M, for purposes of illustration only, is presumed to be adapted for the reception of a single eight film 8f. Thus the introduction of the magazine automatically clears the compartment for its accommodation, as is described and claimed in our parent patent.

It is of course understood that we prefer to use a magazine which embodies its own tensioning or other compensating mechanism, as later described; but in such instances as those in which a user is satisfied with the results which he thus obtains, a magazine without compensating means may be used.

Between the two compensating mechanisms above described lies a gate which includes a section generally indicated as 55 which is permanently mounted upon an irregularly shaped support which forms a portion of the front wall 15 of film compartment C, as best shown in Figure 16. This member also includes a film contacting portion 56 and a forwardly facing flange or right angled extension 79 which acts as a bearing for parts later described. Within this plate is a T-shaped aperture 59 in line with lens L. Cooperating with the fixed gate member is a movable gate member 60 mounted upon a headed stud 61 which is supported by an L-shaped gate control member having a short upstanding leg 62, in which the stud is fixed, and a long leg 63 which operates in a slot 54 (Figure 23) cut in the floor 14 of the film compartment. As the film 8f or 88f passes through the gate, it is held between movable plate 60 and fixed plate 56, the movable film contacting plate being free to move as necessary against the tension of a light coil spring 60'. Relief, as is common in this art, is provided for emulsion bearing surfaces of the film. The gate is opened by the movement of plate 62—63 to the rear in a manner later to be described, thus moving movable gate member 60 away from the film. A positioning claw or finger 64, operable by mechanism later described, projects through the fixed gate section and during such times as the film is motionless at the gate holds the film fixed. Vertical movement through the gate to expose the film is afforded by an intermittent pull-down claw or finger 65 which is operated in a manner likewise later to be described. Lens L is mounted upon a tube 66 in alignment with the exposure opening in the fixed gate section. A diaphragm ring 67 controls a diaphragm, not shown.

A movable edge guide 69, the construction of which will be evident from Figures 16 and 23, is moved under the film prior to the complete closing of the gate as above described. That is, it then engages the edge of the film relatively adjacent the floor of the film compartment. This edge guide includes a front portion 70 which is bevelled upon both edges. The bevel upon its edge relatively adjacent the film permits it more easily to slip under the film as the guide is introduced. Its bevel upon the opposite edge relatively adjacent the floor 14 of the film compartment permits it to ride over a light leaf spring 72 as it is pushed into position. At each side, portions 71 are cut away. This spring is placed between this guide and the floor of the film compartment, thus tending to move the guide toward the film and keep it in engagement with an edge thereof. As the edge guide, by means later to be described, is pushed underneath the film until the cut-away portion passes beyond the adjacent sides of the bounding surfaces of aperture 59, the guide is held close to the floor and relatively away from the film. There it is freed and the spring raises it into operative engagement with the film. In those instances in which the camera is employed with open reels, side plates 52 serve to guide the other edge of the film, and when a magazine is used, it may carry its own upper edge guide, as in said patent to Morsbach Number 1,937,354. Claims to operate an upper edge guide which is a part of a light-trap such as generally shown herein will be found in said co-pending application.

It will thus be understood from the above description, that we are providing an improved quadrilateral gate section of which at least two of the four members are operated in sequential relation, one to the other.

As previously stated, an important element in this invention is the recording of the amount of film, whether upon open reels or in the magazine, as it is exposed. Also as previously stated, these structures may be alternatively used with a magazine which carries a single eight film and open reels which carry a double-eight type. This invention also includes mechanism which is adapted for alternatively handling a film of relatively wide width upon open reels and of the same width in a magazine, as is illustrated in Figure 29 and described in connection therewith.

We shall first describe a metering structure which is adapted for the alternative handling of a relatively wide film upon open reels and a relatively narrow film in a magazine.

As is clearly shown in Figure 16, the supporting leg 62 of gate slide 63 which supports the rear or movable gate section has a right-angled extension 73 which in a relatively long bearing supports a rotatable shaft 74. Mounted on this shaft is a sprocket 75 which as the movable gate section 60 is moved to closed position engages a film in line with its perforations. As the film begins to move, a tooth of the sprocket will slip into a perforation, if it has not already happened to coincide with one. If desired, a spring pressed pressure plate may be disposed upon the fixed gate section opposite this sprocket, with an aperture into which the teeth respectively fit as the sprocket revolves. Thus sprocket 75 is rotated in one direction by forward movement of the film 88f as it is coiled upon take-up spindle 41 or in the other direction as it is back-wound upon the delivery spindle 30.

A one-toothed gear 76 is also mounted upon shaft 74. When the gate is closed, sprocket 75 is brought into engagement with the film 88f, and this gear 76 meshes with gear 77 which rotates on a stub shaft 78, suitably fastened to a right angled extension 79 of the support for fixed gate section 56. Coaxially mounted on gear 77 for movement therewith is a one-toothed gear 80. When cover 17 is closed, a gear 81 attached to the cover by a stub shaft 82 meshes with this gear 80. Gear 82 carries at its opposite end a plate 83 having indicia 85 for the amount of film which has been exposed or remains to be exposed, as is desired. Surrounding shaft 82 and bearing against both indicia plate 83 and cover 17 is a leaf spring 86 which holds the indicia plate from unwanted movement, yet permits its manual re-setting. Plate 83 is set within a disc 90 which has an annular opening for its reception.

By reason of the above construction, it will be evident that when a film of relatively great width, such as a double eight, is used within the film compartment C and the cover closed, the footage which is moved through the gate will be recorded upon dial 83. When, however, a magazine accommodating a relatively small amount of film is employed, such as a single eight, sprocket 75 will not be in contact with the film, and hence will not move dial 83.

It should be understood that the easy engagement of these and other gears later described as a cover is closed presents no problem since the cover, which supports one of the engaging members, moves on an arc so that at the moment of contact the cooperating gears easily slip into correct relation with each other. If desired, each tooth may be made pointed.

When a magazine M, shown in dashed lines in Figure 16, accommodating a single eight film 8f is within compartment C, the above described dials will be moved by the passage of the film within the magazine between the delivery and take-up masses in either direction. To accomplish this result, a gear 92 mounted upon a stub shaft 93 and meshing with gear 81 depends from cover 17 upon a stub shaft 93. While the above described structure is used with a film upon open reels and is operated by sprocket 75 the lower portion of gear 92 merely idles within the film compartment and engages nothing. When, however, a single eight magazine is placed within the compartment, gear 92 is driven by a mechanism disposed upon the magazine and driven by the film which is moved therewithin. Under these circumstances, sprocket 75 in turn idles, since the single eight film contained within the magazine is disposed below the portion of the gate structure wherein sprocket 75 rotates.

It will be understood that the above mechanism which is moved by the film is very light. The extra burden which is thus placed upon the film is very slight and without harmful effect.

Since this apparatus is designed for the alternative and successive reception of two different types of film, it is desirable to provide two indicating discs which are jointly moved by the film but may be manually moved relatively to each other.

As previously stated, disc 83 rotates within a central depression within annular disc 90. In addition to indicia 85 upon the face of disc 83, indicia 96 appear on the face of annulus 90, as will be clear from Figure 14. An index finger or arrow 97 cooperates with both sets of figures. At one extreme index reading, for example zero or fifty, an arm 98 projects outwardly and upwardly from disc 83 and at right angles above the surface of annular disc 90. As disc 83 revolves in a clockwise direction as shown in Figure 14, arm 98 engages a knob 99 which is mounted upon annulus 90. When arm 98 and knob 99 are in engagement as illustrated in Figure 14, the indicia of disc 83 and annulus 90, the former, viewed against fixed arrow 97 upon the cover and the latter, viewed in relation to a contact and indicating edge 100 attached to arm 98, give identic readings. During the use of a first film, for example, the two discs will move together with identic readings, since spring 83 tends to hold the two together. The above construction, however, makes it possible by a hand movement of knob 98 in a clock-wise direction to make the readings of the two discs whatever may be desired. One disc may be set to correspond with the film already exposed upon a partly used magazine which has been placed in position while the other records the footage which has been exposed upon an entire subject. For example, it may be assumed that a photographer uses 14 feet of a previously unexposed panchromatic film within a single eight magazine, removes the magazine from his camera, and places within the camera (in a dark room) a color film on open double eight reels of which he has used, say, 20 feet. By hand he thereupon sets the outer meter disc to indicate the 20 feet which has been exposed from the film which is now in operative position. He thereupon exposes 8 feet of the color film. His meter then shows him that he has 28 feet of the color film but that his photographic operation has consumed only 22 feet—fourteen feet of panchromatic plus eight feet of color. He thereupon reinserts the original panchromatic film, sets the dial indicating ring back to fourteen feet, and exposes say eleven feet more. He then knows that his current picture is 33 feet in length and that he has used 25 feet of panchromatic film from his magazine. By means yet to be described, at all times a meter upon the magazine indicates the footage which has been used of the film therein. Owing to the difficulties of removing and reinserting partially used film on open reels such films are generally completely exposed before removal.

Before a fresh film is inserted in a compartment or a partially used magazine or reel is reinserted therein it is often desirable that the meter which is mounted on the apparatus be automatically reset to zero or maximum position as the case may be while the meter upon the magazine remains fixed. Mechanism illustrated in Figures 14 and 15 accomplishes this end whenever the cover is opened.

A pinion 103 coaxially mounted on gear 81 for movement therewith is engaged by an L-shaped arcuate re-setting arm 104 pivoted at 105. The short leg of this latch is a rack 106 engaging pinion 103. The opening of the cover 17 moves this rack rearwardly, while rotation of the dials moves it idly in the other direction. For the closing of the cover to give this leftward movement thereby re-setting the dials, a headed pin 106′ is attached to re-setting arm 104 and engages a slot 107 in an L-shaped control slide 108 having a right-angled control lug 109 which, upon the opening of the cover 17 is released by the front wall 15 of the film compartment, thereby through co-action between pin 106′ and the end of slot 107 moving the L-shaped member in a re-setting direction. Slide 108 is supported by headed pin 106′ and a strap 111 attached to the cover. To provide constant engagement between pin 106′ to move slide 108 forwardly as shown in Figures 14 and 15, a spring 112 extends between a pin 113 formed upon strap 111 and a pin 114 attached to and movable with slide 108.

A meter structure adapted for use with films of the same width, either supported upon open reels or in a magazine, is illustrated in Figure 27 and described in connection therewith. Figures 28 and 29 illustrate meters and their control structure wherein a meter upon a camera is automatically set to correspond to a meter upon a magazine placed within the camera.

A magazine adapted to cooperate with a film handling apparatus having the characteristics above described will now be described. As in our said parent patent and as previously stated we prefer to employ a magazine embodying the Bundick and Proctor tension control system of feeding. We show a magazine M of the general type previously defined. This magazzine, as will best be seen from Figures 2, 3, 4 and 5, is in effect a quadrilateral box with rounded top and bottom rear corners and made of metal or of other suitable material such as a plastic. It consists of a body member 115 and a light-proofing cover 116. This cover may carry a fixed edge guide 116' (Fig. 3) of the Morsbach type previously identified. A gate-receiving recess 117, across which the film extends, is provided with an automatically operated light-trap later described. Within the magazine are a delivery core generally designated as 118 from which the film is unwound, a take-up core generally designated as 119 to which the film is attached and upon which it is wound, a resilient delivery tensioning member 120, a delivery guiding channel 121, a take-up guiding channel 122, and a resilient take-up tensioning and compensating member 123. In Figure 3 the film 8f is shown in dot and dash extending between the two cores and passing across the gate-receiving recess 117, an exposing operation being just under weigh. Mechanism associated with the delivery mass is illustrated in Figure 10 and a preferred variant in Figures 12 and 13.

Mechanisms per se for mounting and handling the delivery mechanism 118 and the take-up core 119 within the magazine are of the first order of importance and in certain of their aspects and combinations are described and claimed in our said co-pending parent application now Patent Number 2,351,088. In combination with the apparatus hereof, such mechanism associated with the delivery mass is claimed herein. As previously stated, it not only permits the use of a magazine in a film compartment which also accommodates an open reel, as in our parent patent, but also locks the delivery mass against unwanted unwinding and controls such locking devices in interlocked relation with the control of a light-trap.

We prefer to conserve the advantages which are explained in said Morsbach Patent Number 2,175,538 which arise from the provision of a delivery mass with a floating center. It is thus possible to make use of the initial revolution of the then relatively small take-up mass to overcome the starting inertia of the then relatively heavy and large delivery mass. Since this provision of a floating center permits the periphery of the delivery mass to rest upon that of the take-up mass, the initial powered revolution of the take-up mass is communicated to the delivery mass, thus overcoming the inertia which at this point might otherwise be over high. Later as the mass of film upon the delivery side of the gate decreases and that upon the take-up side, where the film is driven, increases, this difficulty does not exist. Also the provision of such a floating center makes for enconomy of space.

In order to provide the above floating center, an arm 126 is pivoted at 127 to the floor of the magazine body 115, as shown in Figure 3. The delivery mass is supported upon the opposite end of this arm. As shown in Figure 10, this support is in the form of an annulus 128 which has an upturned inner lip 129. This annulus may be attached to arm 126 or may be formed integrally therewith. This annulus rests upon an irregularly shaped circular plate 130 which has an upturned inner flange 131, an intermediate upwardly raised portion 132, and a driving depression 133 formed in this intermediate portion for co-action with driving lug 31, previously described. Depressions 135 formed in the bottom and top sides of the magazine both engage the edge of the film at some points to serve as edge guides and adjacent plate 130 tend to limit movement thereof. The film itself is wound upon a core 136 with its trailing end fastened thereto by a clip 137. This core is loosely placed in annulus 128. Movement is communicated from lug 31 through plate 130 to core 136 by means of an irregularly shaped pin 138, one end of which is attached as by a rivet 139 to the core and the other end of which works in a slot 140 cut in plate 130. This construction is necessary in view of the fact that the axis of rotation of the delivery mass floats upon the arm 126. As the core is rotated in an exposing direction by the traction of the film, this construction is effectively idly to rotate the spindle of the apparatus. As the back-winding device and the spindle driven thereby are rotated in a contrary direction, this movement is communicated to the core and the film.

In order to provide a light-tight inner construction, a sleeve 142 depends from cover 116 of the magazine. It engages the upper portion of a co-operating collar 143 which is held at its upper end by collar 142 and at its lower end by inner upward extension 131 of irregularly shaped plate 130. For purposes later to be explained, sleeve 143 is movable upon sleeve 142. It will be understood that sleeves 142 and 143 co-operate to form a light-proof tube extending through the magazine and adapted to surround delivery spindle 30 of the camera as taught in our said parent patent. It is to be noted also that the diameter of the tube thus formed is considerably greater than the diameter of the spindle 30, so that it is possible for the delivery mass to float upon arm 126 relatively to the axis of spindle 30.

As previously stated, an important part of the present invention is the provision of means whereby the delivery mass is maintained locked against unwanted unwinding at all times when the magazine is not disposed within the apparatus. Likewise as shown in Figure 10, locking member 145 is supported by a pin 146, which extends downwardly from the cover 116 of the magazine to the floor of a spring housing 147 attached to and extending from collar 143, and a headed pin 148, likewise extending downwardly from the cover of the magazine. A spring 149 within housing 147 tends to force this locking member into a locking position and away from cover 116 in a direction contrary to the indication of the arrow in Figure 10. Locking arm 145 co-operates with a series of openings formed between pointed serrations 151 in the upper rim of core 136. By reason of the above construction, it will be understood that locking bar 145 normally is held in locking relation to the core and its unwinding therefore prevented. Such is the position shown in Figure 10. Core 143, however, is provided with a downwardly extending lip or edge 153. As the magazine is placed in assembled relation with the camera, this edge engages upstanding driving lug 31 of the delivery spindle and through the pressure of spring housing 147 upon locking bar 145 moves that bar against the pressure of spring 149 in the direction of the arrow of Figure 10 and out of engagement with the locking serrations, thereby permitting the core to be moved. When the magazine is removed from the camera, spring 149 thereupon forces locking bar 145 into locking relation with the core. The slight drag that the above structure places upon the delivery mass makes it unnecessary to supply a spring detent such as is often used to prevent too rapid unwinding or over-running.

For a preferred modification of the above structure wherein it is operated by the movement of the light-trapping shield in interlocked and timed relation therewith, reference is made to the alternative structure illustrated in Figures 11, 12 and 13 and described in connection therewith.

The take-up core 119 is irregularly shaped and is supported upon flanges 155 extending toward each other from the side walls of a magazine and co-operating with the core to form a light-tight passage through the magazine. If, as we may prefer, the take-up core is made out of a resilient metal, driving lugs or protuberances 156 are struck inwardly to grip the spindle 41. Alternatively, if the core is unyielding, these driving members may be made of spring material and fastened upon the core as by spot welding.

As the magazine is placed in position in its compartment, the spindle 30 passes through the tube formed of sleeves 142 and 143 without contact therewith and the spindle 41 passes through the opening in the take-up core, the driving members 156 gripping its surface. It will be understood that no hand manipulation of any kind is required from the operator. The magazine is so constructed that the film bridges the gate-receiving recess 117. As the magazine is placed within its compartment, rods 45, previously described, engage openings 157 in the magazine to guide the magazine into proper position, the film being directed between the gate sections, which at this time of course are separated, and the two spindles necessarily being inserted into the openings in the magazine made to receive them. As the magazine is thus dropped into position, the tensioning mechanisms for open reels, which at this time are disposed in the film compartment, are displaced therefrom. We prefer to hold the magazine in such assembled relation to the camera by the mechanisms described and claimed in our parent patent. Alternatively, a latch operated by the general control mechanism later described may be provided to hold the magazine in place. In a reverse operation after exposure of the film, as the cover is opened, springs 49 acting through plates 51 tend to raise the magazine sufficiently so that it can be easily grasped and removed. Alternatively, we may provide devices under the control of the general control mechanism to eject the magazine.

As previously stated, we prefer that a magazine used with the camera hereof carry its own meter and at the same time operate the meter which has been previously described as disposed upon the cover of the film handling apparatus. To that end, mechanism is provided within the magazine whereby a film housed therewithin as it moves in either direction operates gear 92 which depends from the inner surface of cover 17, as previously described. As is best shown in Figures 7 and 16, as the cover is closed, gear 92 engages a relatively large disc-gear 160 revoluble upon a shaft 161 positioned in the cover 116 of the magazine. Indicia 162 are carried by this gear and co-operate with an arrow 163 or similar marking engraved upon a gear cover 170. As is clear from Figures 7 and 8, this disc-gear is driven by a single-toothed gear 164 revoluble with a pinion 165 which in turn is driven by a single-toothed gear 166 revoluble upon a shaft 167 to which is also attached a sprocket 168 which is driven by the film, as best shown in Figures 3 and 8. If desired, a resilient gate-like structure or pressure member may be provided to cooperate with this sprocket.

In order to protect the above structure, a cover 170 is fixed to the cover of the magazine. It is formed with an arcuate recess 171 which permits engagement of disc-gear 160 by pinion 92 when the magazine is positioned within the magazine. So that the meter of the magazine is not disturbed by accidental movement of this gear-disc when the magazine is outside of the camera, a subsidiary segmental cover 173, pivoted upon shaft 161, is provided which when the magazine is placed in the camera and made ready for operation is automatically moved from a first or protective position, wherein it covers arcuate recess 171 formed in fixed cover 170, to a second or running position, wherein it frees the disc-gear 160 for engagement by the teeth of pinion 92 upon the closing of the cover. Prior to removal of the magazine, this segmental cover is automatically moved to its protective position and after the magazine has been inserted in the camera, this cover is moved to the second or free position so that the mechanism of the meter of the magazine may engage and operate the meter of the camera.

This segmental cover is L-shaped in cross section and has a main body portion 173 and an upturned and re-entrant covering lip 174 which protects the teeth of the gear. As best seen in Figure 8, this body portion extends away from shaft 161, upon which it is pivoted, and between the gear-disc and the cover of the magazine and slightly beyond the teeth of the gear-disc, and the lip extends first upwardly parallel to the exposed edges of the teeth and thereafter backwardly over the top of the teeth between the gear-disc and the bottom surface of the fixed gear cover 170.

As will be clear from a consideration of Figures 7 and 8, this segmental cover 173 is rotated between these positions by an arm 175 or extension from a U-shaped protective member 176 which is an important element of our light-trapping devices, as will later be explained. This extension at its end relatively remote from the film path embodies a bifurcation 177 with which coacts a pin 178 which extends through a slot 179 in the cover 116 of the magazine and is attached to the body portion of the segmental cover. It will thus be seen that movement of arm 175 backwardly, or to the right as shown in Figures 7 and 8, will rotate segmental cover 173 to the first or closed position and movement in a contrary direction toward the front of the magazine will rotate the cover in a contrary direction to the second or open position, thereby freeing the teeth of gear 160 for engagement by those of gear 92. Means whereby such movement is given to arm 175 as the cover of the apparatus is respectively opened and closed will later be described in connection with light-trapping mechanism.

This light-trapping mechanism includes a film enclosing tube 180 which is movable between a first or protective position wherein it extends across the gate receiving recess 117 of the magazine, thereby protecting the film, and a second or running position wherein it is disposed within the magazine, thereby freeing the stretch of film extending across this recess for engagement by the gate of the apparatus and the pull-down. In Figures 4 and 5, it is shown in the first or protective position and in Figures 3 and 7 in the second or running position. While this tube is in this second position it is disposed throughout its entire length in a delivery pocket 181 which is formed as an enlargement between the end of the delivery guiding channel 121 relatively distant from the delivery mass and gate receiving recess 117. The rear wall of this pocket is a rigid but angularly offset plate 183. The forward or outer and upper walls and the top and bottom walls are formed of a light resilient U-shaped plate 184 which is attached at its end relatively near to the delivery mass to the inside of the outer wall of the body of the magazine. This U-shaped member is laid on its side, as it were, with one leg 185 forming the lower wall of the compartment and the other leg 186 forming its parallel upper wall, as best seen in Figure 9. Thus this U-shaped member forms an inner three-sided light-trapping enclosure for the main light-trapping tube 180. The line of attachment of the U-plate to the body of the magazine is along its upper end only and in a direction normal to the longitudinal axis of the U-shaped plate and the line of movement of the film. A spring 187 passing between a downwardly extending lug 188 formed in the lower right-hand portion of upper leg 186 and a portion of an auxiliary fixed shield 189, later described, tends to pull the U-shaped plate backwardly or to the right as viewed in Figures 3, 4 and 9. Leg 186 passes over shield 189 and at this point is attached to or extends into the extension or arm 175 which operates the auxiliary or segmental cover 172 as previously described. Fixed light shield 189 passes backwardly and downwardly, as viewed in Figure 7 behind the backwardly extending indentation 190 which in the front wall of the body of the magazine outlines the gate receiving recess 117 and joins take-up guiding channel 122 just below, as viewed in Figure 7, a take-up pocket 192 disposed between the recess and the take-up channel. When the light-trapping tube 180 is situated in the first or protective position, as shown in Figure 4, its lower end is disposed and firmly held in this pocket as it bridges the gate receiving recess while its upper end is within the lower portion of the delivery pocket. As it is moved to the second or operative position, this end is retracted from this pocket and disposed entirely within the delivery pocket.

Such movement, however, cannot be in a straight line and also must be carried out in closely timed relation to the actuation of others of the operable parts of the apparatus. As will be clear from an examination of Figure 1, fixed gate plate 56 necessarily extends backwardly from a front wall 15 of the film-receiving compartment of the camera in order to establish a film in the focal plane of the lens which is spaced backwardly from the front wall. Also, lower edge guide 69, when the parts are in film exposing position, projects backwardly of this fixed gate plate and into engagement with the film. Moreover, as indicated in small-dash line in Figures 3 and 4, the pulldown and positioning claws likewise project backwardly. As will be readily apparent, the tube 180 which surrounds and protects the film must extend in all directions therefrom. Consequently, at the time at which the magazine is placed within its compartment, this tube should not be positioned with the film in its operation position since conflict might ensue. As is very clearly illustrated in Figure 3, if the protective tube when in protective position were placed in direct line with the path of the film when being exposed it would conflict with the claws, and with the fixed gate section. Instead, it, and of course the film therewithin, when in protective position should be retracted so that it does not make contact with the fixed gate plate 56 or with the claws. Also, there must be no conflict between edge guide 69 and this protective tube. Moreover, the movable gate section 60 should not be moved forwardly until the protective tube has been completely retracted. Similar conflict also must be avoided when the magazine is to be removed.

To accomplish the above ends, which as previously stated are among the important elements of this invention, we provide means whereby the protective tube with the film therewithin is positioned backwardly from its operating position and clear of the fixed gate section and the claws when the magazine is placed within the apparatus and withdrawn therefrom. After the magazine is in place, however, the tube is automatically withdrawn and the film brought forwardly into its operating position adjacent the fixed gate section. Prior to the withdrawal of the magazine, the tube is replaced in light-trapping position and simultaneously both film and tube moved backwardly clear of the fixed gate section and claws so that the magazine may be removed without conflict. Sequential control mechanism also is provided so that the edge guide is not moved backwardly into contact with the path of the film nor the movable gate member moved into film engaging position until after the tube has been withdrawn from its protecting or first position.

It will be realized that this tube, when disposed in its second or operative position forms a part of the smooth sided continuous channel which guides the film through its path.

Tube 180 is moved between these positions by an upstanding control pin 194 which is operated in a manner later to be described, in the necessary timed and sequential relation to the actuation of other of the pertinent operable parts of the apparatus.

Control pin 194, which is a portion of the general control mechanism later described and is operated thereby, fits into an opening 196 in a lug 197 which extends downwardly from the protective tube 180, as is best shown in Figure 6. Cooperating with this opening is a latch 198 in the form of a leaf spring which is attached to the bottom of the body of the magazine and extends therefrom to the forward face thereof in a direction parallel to the optical axis of the apparatus. The forward end 199 of this latch is wedge-shaped and fits within the opening 196 thereby normally holding tube 180 in the first or protective position. The inclined face of the wedge faces upwardly or to the left as viewed in Figure 6 so that when the tube is brought into its first or protective position, that shown in Figures 4, 5 and 6, from the second or open position as shown in Figure 3, this latch is elevated by the coaction of its wedge-shaped portion with the leading end of the lug 197 and thereupon drops into the opening 196. Until it is displaced from this opening, however, its vertical or square portion prevents movement from protective position. As the magazine is placed within the compartment C, control pin 194 engages this latch and lifts it out of latching position thereby transferring control of the light-trap to the general control mechanism later described.

At this point, with the parts in protective or light-excluding position, it will be understood that the parts are disposed as shown in Figures 4, 5 and 6 with the lower end of the U-shaped plate 184 pressing firmly against protective tube 180 and preventing the entrance of light within the magazine. Also it will be understood that at this time tube 180 is in the position shown in Figure 4 and is disposed slightly back of the relative position of the plate 56 and the claws, as shown in small-dashed lines in Figures 4 and 5. As control pin 194 is moved upwardly as seen in Figures 3 and 4 or to the left as seen in Figures 5 and 6, protective tube 180 follows the inner wall 183 of the delivery pocket with the U-shaped protective tube continuously bearing against its front surface and maintaining the parts in close and light-excluding contact. The path which is followed by tube 180 is determined by cam slot 367 (Figures 23, 24, 25 and 26) of the general control mechanism, later described, and is so designed that the lower end of the tube, as viewed in these figures, is moved in a straight line until it has cleared the fixed gate section at which point it is moved sharply forwardly to the position shown in Figure 3 wherein it is locked by the apparatus. The film likewise follows a similar path and is brought forwardly to a position adjacent the fixed gate section and claws. Thereafter movable gate section 60 is moved forwardly and engages the film, all by operation of the general control mechanism later described and under the influence of the closing of the cover.

As will be understood from the foregoing portion of this description, such movement from the first or protective to the second or running position of tube 180 and its U-shaped protecting plate 184 is effective through arm 175 to rotate segmental cover 174 away from the teeth of disc-gear 160 thus making possible their engagement by the teeth of the pinion 92 carried by the cover. Since the general control mechanism is under the control of the cover it will be understood that all of this movement takes place in the desired timed relation to the movement of the cover.

Figure 11:
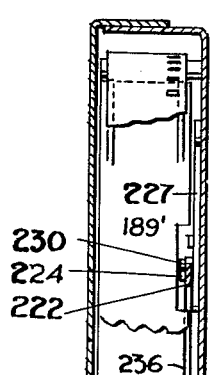
Figure 11 is a fragmentary view partially broken away and partially in section showing a preferred modification of our invention in which a lock for a delivery mass of film within a magazine is controlled jointly with the operation of our improved light trap. It is taken on the line 11—11 of Figure 12.

As will be clearly seen from Figures 11, 12 and 13 we may prefer to operate a lock for the delivery mass in the magazine by movement of a light-trap. To that end we connect a core-lock and the light-trap whereby operation of mechanism which moves a protective tube from a first or protective position as shown in Figure 13 to a second or open position as shown in Figure 12 frees the delivery mass so that it can be unwound, or back-wound, while movement from the second back to the first position again locks it. We prefer a close interlock between light-trap and lock.

In this embodiment of our invention, the delivery mass is carried by an arm 211 pivoted at 212 as previously described. Attached to or formed integrally with this arm is an annulus 213 which rests upon an irregularly shaped circular plate 214, an inner portion of which is formed with an upstanding collar 215 which engages a cooperating tube 216 which extends downwardly from a top cover of the magazine. As described in connection with Figure 10, an intermediate portion of this plate is deformed at 217 so that it engages delivery lug 31 of the apparatus. Motion is communicated from this slot to a core 218 by an upstanding pin 219 working in a slot 220 in plate 214, this construction being necessary because of the floating center of the delivery mass.

Upon a lower portion of delivery core 218 a surface is milled (not shown) which cooperates with a similar surface formed upon an upstanding lug 221 formed at the end of a locking control arm 222 which moves with and relatively to arm 211. Arm 222 is guided upon arm 211 by its pivot pin 212 and an upstanding pin 223 attached to arm 211. Suitable slots cooperate with each pin to prevent longitudinal movement of arm 222 relatively to arm 211. A pin 224 attached to the end of control arm 222 most remote from its locking surface works in a cam slot 226 which is formed in a control arm 227 which extends upwardly from a protective or light-trapping tube 180'''. This connection is formed by a lug 229 extending from the tube at its upper end and an opening therein which engages a pivot pin 230. As protective tube 180''' is moved, the camming portion 231 of slot 226 will act upon pin 224 to move control arm 222 toward or away from the take-up mass thus locking or unlocking the take-up core. It is to be noted that the portion of slot 226 indicated at 231 is an arc of which pin 212 is the center. A light leaf spring 233 bears against the forward side of control arm 222 when it is moved to locking position and holds the parts in locking position. Control arm 227 is guided by a pin 234 working in the cam slot, and lug 229 works through a slot 236 in back wall of 189' of the delivery pocket and is guided thereby.

In the previous portion of this specification, we have illustrated our invention as applied to and in certain of its combinations including a floating spindle of the Morsbach type as shown in his said Patent Number 2,175,538. In this patent also the resilient take-up tensioning arm 123 is extended relatively far, thereby extending the length of the take-up channel 122. As is later explained more at length, this floating spindle makes it necessary that the take-up spindle be wound in a counter clockwise direction in order that the movement of the delivery mass in the initial stages of feeding may be engaged by the power driven take-up mass and assisted by its movement. Films which are wound upon open reels are ordinarily intended for use with apparatus in which the take-up spindle is driven in a clockwise direction. So that winding of open reels used with our apparatus may be in accordance with this common practice, as described and claimed in our said co-pending parent application, we provide two alternatively effective take-up drives, one for a magazine of the Morsbach type and the other driven in a contrary direction for use with open reels.

It should be understood, however, that all of the elements of this invention, except, of course, those which are particularly directed to a floating spindle and mechanism especially cooperating therewith, may be used with equal advantage with a magazine wherein both spindles revolve upon a fixed axis. Such a magazine is shown in Figure 2a. The numerical reference characters which are applied to this figure are the same as those applied to similar parts in other figures hereof except for the addition of a prime character. The light-trapping tube 180' of this magazine may be operated as stated in connection with the light-trap 180'' of Figure 2 or that of 180 of Figure 3 et seq. No further description is considered necessary.

A light-trap per se such as that which has just been described in connection with Figures 3 to 9 inclusive may also be employed in connection with the magazines of Figures 2 and 2a. A light-trapping tube 180'' shown in those figures which is very similar to tube 180 above described is moved by a connection with a latch of a film compartment. Such movement of this latch to latching position, after the magazine has been disposed in its compartment, moves the light-trapping tube to inoperative or running position and thereafter brings a movable gate section into engagement first with the film bridging the gate receiving recess and immediately thereafter with the fixed gate section. Provision is made for sequential movement of the tube away from running position and the closing of the gate. An edge guide upon the magazine is operatively connected with the tube. It will thus be noted that while the tubular light-trapping structure shown in this application and that of the said co-pending application are closely similar, the arrangements for actuation and for the edge guide differ. For a detailed description of this structure and claims thereto, reference is made to said co-pending application.

Having described the film handling elements which enter the film compartment for engagement with the film and otherwise, certain of the devices for measuring the film, and certain magazines and their light-traps which may be used in the practice of this invention, we shall next explain sufficient of structure and driving mechanism which may be used in the camera so that the invention may be understood herefrom and thereafter describe control mechanism for the driving means and the general control mechanism and the interlocking operating connections between them.

As will best be seen from Figures 17 and 18, certain plates parallel to the long side of the camera may be employed as mounting means for the apparatus. Below floor 14 of the film compartment C is a main vertical plate 252. Spaced therefrom and parallel thereto is an intermediate supporting plate 46 upon which posts 45 for the depressible tensioning members are mounted as previously stated. Still lower or more nearly adjacent the outer or right side of the apparatus (left in Figure 18) is a main bottom plate 255 which supports much of the control structure of the apparatus and that relating to the moving means. In these figures for simplicity we show the mechanism as supported directly by the right side of the camera but we prefer that it be mounted for convenience in assembly upon a plate adjacent and parallel to this side.

The means for driving the pull-down claw 65 positioning claw 64 and a shutter 258 may be substantially as shown in our said co-pending parent patent, but with the modifications described hereinbelow which are useful for co-action with the control mechanisms of this invention.

Take-up spindle 41, as previously stated, is driven through a slip clutch, not shown, which in turn may be driven by a gear 260.

Gear 260 also drives a pinion on a shaft of a conventional governor, not shown, which in a conventional manner controls the speed of the apparatus. This governor may be of any desired or conventional type or of that described and claimed in Patent Number 1,956,359, dated April 24, 1934, to Kurt Morsbach et al. This gear 260 and hence the apparatus may be driven in any desired or conventional manner, as by a coiled spring as stated in our parent patent. In order intermittently to advance the film, gear 260 also drives a pinion 261 mounted upon a drive shaft 262 which in turn rotates a co-axial disc 263. A crank pin 264 mounted eccentrically upon disc 263 supports and rotates a second disc 265. This crank pin 264 oscillates a pull-down rocking lever 267 suitably shaped and having a slot 268 at or about its mid-point by means of which it both slides and rocks upon a fulcrum pin 270. The opposite end of this lever is formed into pull-down claw 65 which intermittently moves the film through the gate. It will thus be seen that rotation of crank pin 264 by means of gear 260 rocks and oscillates lever 267 and brings its tooth 65 into and out of engagement with perforations of a film, thus intermittently feeding it through the apparatus.

It is, of course, necessary that the shutter 258, which also operates the positioning finger 64, cooperate with the pull-down above described. To this end, we mount eccentrically on disc 265, which rotates coaxially with shaft 262, a headed pin 272 which slides within a bifurcation 273 which is formed in an arm 274 which by an extension 275 is attached to an upstanding shutter plate which comprises a driving portion 276 and the light-obscuring or shutter portion 258 which is offset from the driving portion at a right angle. An edge of this latter portion is guided by a slot 277, and the driving portion 276 by shaft 270 and slot 278. A lug 279 projects from this driving portion into engagement with a camming surface 327 placed upon depositioning arm 324 later described.

Thus it will be seen that the rotation of disc 265 reciprocates the shutter 258 in a plane parallel and adjacent the focal plane of the instrument in coordinated relation to the intermittent movement of the feeding or pull-down claw 65. As described below, this movement is also timed with the operation of the positioning claw 64.

This finger 64 is shown as attached to a flat spring 280 mounted upon a post 281 set in the front of the wall 15. Alternatively, the finger itself and the spring may be made in one resilient piece. As the shutter oscillates, lug 279 engages camming surface 327 of the depositioning arm 324, an offset portion of which bears against the backward side of spring 280 and oscillates it in a direction roughly normal to the plane of movement of the shutter itself, thereby camming finger 64 in and out of the perforations of the film. It will of course be understood that the positioning finger is inserted within a perforation of the film while the shutter is not in light-obscuring position and the pull-down claw is going through the inoperative portion of its cycle and is withdrawn therefrom while the pull-down claw is transporting the film and the shutter is closed. Its in-and-out movement may be as little as of the order of one sixty-fourth of an inch. When the apparatus is not in operation, the pull-down claw is retracted and the positioning claw moved toward the position occupied by a film. If desired, we may arrange the details of the cycle so that the pull-down claw is nearer the operational film path when the apparatus is at rest. Or, both fingers may be withdrawn at that time.

For many purposes, we prefer to employ with the above or any other pull-down or positioning claw the automatic framing mechanism which is described in connection with Figure 31 hereof.

We next describe a movement control mechanism which, at the will of the operator, (1) releases the pull-down intermittently to expose an unlimited length of film (station S—1); (2) releases the mechanism to expose one frame or picture at a time (station S—2); (3) locks the mechanism in running position (station S—5); or (4) retracts the positioning claw from the film path to permit the film to be back-wound without interference (station S—4).

These operations are properly and automatically correlated to those which are carried out by the general control mechanism, later described, which is actuated by movement of the cover. Movement of control button 40 from threading or neutral station S—3 to each of the above stations operates the mechanism in the manner indicated. The portion of this description immediately following explains the mechanism which is moved and a subsequent portion means which are employed operatively to connect this mechanism and the unitary control button 40.

To start and stop the pull-down, and with it the take-up and shutter, we provide a control disc 282 which has a projecting stop 283 and is revoluble upon shaft 262. Hence the starting or stopping of this device starts or stops the entire apparatus. This projection is engageable with dogs 284 and 285 respectively formed in the lower end of control arms 286 and 287 respectively as shown in the drawings. These arms are pivotally mounted upon shaft 270. A spring 288, which is attached to posts 289 and 290 placed in their upper ends respectively as best shown in Figure 21, holds them in the positions shown in the drawings. It will be seen that upon the movement of the upper portion of the arm 286 alone backwardly, or to the right as shown in Figure 19, the dog 288 will be withdrawn from holding relation to the stop 283 and the motive power of the apparatus will thereby be released to start the operation of the camera to take a series of pictures in motion. As later described, this release takes place when button 40 is moved to station S—1. Movement of the upper portion of the arm 287 forwardly, to the left as shown in Figure 19, will place the dog 284 in stopping position for engagement with the projection 283 upon revolution of control disc 282. Coupled with this movement of the arm 287 to the left is movement of the upper portion of the arm 286 to the right so that the projection 283 is freed and permitted to make almost a complete revolution until it is stopped by the dog 284 thus exposing a single picture. As is later described, both arms are so moved when control button 40 is moved to station S—2. Control arm 286 carries an upstanding blocking projection 291 by means of which neither it nor arm 287 can be operated except when the cover is closed and all film engaging parts in running position. The devices which accomplish this end, including blocking projection 414, are explained in connection with the description of the general control mechanism by which they are operated.

Mechanism shown in Figures 17, 18, 19, 20, 21 and 22 is employed to shift these arms and thus start and stop the operation of the camera.

An arm shifting plate 293 is fixed for rotation only upon a main control pivot pin 294 which is journalled in control support plate 255. This plate 293 at its upper end is formed into a right-angled lug 295 and at its lower end into a right-angled lug 296. These lugs are so disposed that upon rotation of plate 293 they engage and move arms 286 and 287. Such rotation is afforded by co-action between a small rectangular slide 297 likewise fastened to pin 294 or preferably formed integrally therewith which is disposed within a control slot 298 which is formed in a main control plate or slide 300 which both rocks and slides. As it slides, it does not affect slide 297 but as it rocks it also rocks plate 293 through slide 297.

To rotate plate 300 and hence through the structure just described to move lugs 295 and 296, button 40 is attached to this main control slide 300 by a pin 301′. This button may be rocked or moved transversely in a T-shaped slot, having an arcuate cross arm 301 and a straight arm 302, which is formed in a recessed formation 304 within the right outer side wall 305 of the camera adjacent the top, this wall as viewed in Figure 18 being above the left. Movement of this button to station S—1 against the power of spring 288 causes lug 295 to engage arm 286 and move it as shown in Figure 19 in a clockwise direction, thus removing dog 284 from stop 283 upon control disc 282 and thereby releasing shaft 43 and the entire mechanism for revolution. Dog 285 is already disposed out of the path of stop 283. At this time, the user must manually hold the button in this position against this spring power, as is common in apparatus of this type. If, however, he wishes to lock the control mechanism 301 in exposing position, he moves the control button further along the arcuate slot 301 and to station S—5. As is best shown in Figure 19, such movement causes a forwardly extending protuberance 306 formed upon movement plate 300 to engage a latching formation 307 formed in a leaf spring 308 attached to a convenient fixed portion 13 of the interior of the camera casing. Coaction between projection 306 and detent 307 locks the mechanism in exposing position. Movement of the control button in a contrary direction will release this latch and cause this control structure to return to the S—3 or threading position also under the influence of spring 288. Mechanism will later be described whereby this locking device is rendered inoperative except when the apparatus is in running condition, with its cover closed. Conversely, this lock is operable only when the cover is closed, both movable gate members in exposing position, and the film free from the light-trap.

When it is desired to make a single exposure, the control button is moved in the opposite direction to station S—2. This movement causes lug 296 to engage the forward side of arm 286 and to move its upper end as viewed in Figure 19 in a clockwise direction and lug 287 to engage the rearward side of arm 287 to move it in the opposite direction. Thereby dog 284 is moved away from stop 283 thereby freeing the control disc for rotation, but dog 285 is moved into its path thereby stopping the control disc after one revolution whereby one picture or frame is exposed.

As previously stated, an important element in this invention is the provision of novel mechanism which permits a film to be back-wound under proper safeguards. The mechanism which we provide normally prevents back-winding. Otherwise a careless operator might apply or attempt to apply our normally operable back-winding means while the film was being fed forwardly by forward operation of the apparatus or at a time when the film channel is not clear of toothed feeding members or the gate not closed. We take the following steps to overcome such a difficulty.

1. Apply a one-way clutch to the delivery spindle which until its release permits rotation only in an exposing direction;

2. Release this one-way clutch to permit manual operation of the delivery spindle in a back-winding direction following movement of single control button 40 to a position wherein the exposing mechanism is rendered inoperable;

3. Provide a feeding channel clear of the positioning claw (or, alternatively, the pull-down);

4. Break the driving connection between the back-winding handle and the delivery spindle except under conditions wherein the gate is closed, the light-trap withdrawn to running position, and meter rendered inoperable.

Provision of mechanisms to accomplish the above steps is among the objects of our invention.

We first describe this one-way clutch.

Below bearing 32 with which spindle 30 is revoluble is disposed a disc 310, the upper portion of which is formed into a series of wedge formations 311 as is shown in Figure 22. Balls 312, held by a retaining collar 313, co-operate with these wedges to limit movement to that in an exposing direction. This disc in the form of a shaft 314 is extended below main frame 252 and attached to a ratchet 315 with which a dog 316 co-operates. This dog is joined to or formed as a part of control arm 317, both arm 317 and dog 316 being mounted upon a shaft 318, and by a spring 319 is urged into blocking relation with the ratchet thus preventing back-winding.

This one-way clutch is rendered inoperative as follows: The forward end of arm 317, as is best shown in Figure 19, cooperates with a camming surface 320 formed on the main sliding and rocking control plate 300. As control button 40 is moved downwardly in slot 302 from the threading station S—3 to the back-winding position S—4, it moves this plate in a downward direction and by engagement between surface 320 and the forward end of arm 317 rotates arms 317 and 316 in a counter-clockwise direction, as shown in Figure 19, against the power of spring 319, thereby freeing delivery spindle 30 for rotation in a back-winding direction when an operator depresses and rotates the back-winding knob of Figure 32 (Sheet 3). Such movement is against the power of a spring 320' (Figure 18) which is attached to pin 294 and a pin 300' mounted upon main control plate 300. Upward movement of the control button away from station S—4 to station S—3 by this spring permits re-engagement of the ratchet by its dog 316, thereby blocking the delivery spindle from back-winding rotation and placing the apparatus in condition for normal operation.

This downward movement of main control slide 300 likewise removes the positioning finger 64 from the film track, thus accomplishing the third result stated above. To that end, the lower portion of this slide is formed into a camming surface 321 which engages a lug 322 which is formed in one end of a relatively long and irregularly shaped depositioning arm 324. The other end of this arm is mounted on fixed shaft 270 at 325 (Figure 18) for slight rocking movement. An intermediate and off-set portion 326 of this depositioning arm passes adjacent the spring 280 upon which the positioning claw is mounted so that when the arm is rocked it moves the claw out of the film track against the pressure of its spring 280. Such rocking movement is provided as camming surface 321 engages lug 322 as the button 40 is moved into the S—4 position against the power of spring 320'. Contrary upward movement under the influence of spring 320' will disengage the positioning claw from the depositioning finger so that it under the influence of its spring 280 will again engage the film. Simultaneously spring 319 returns the pawl 316 to operative position and again makes impossible the back-winding of spindle 30. This depositioning arm is also provided with a camming surface 327 which is engaged by lug 279 which projects upwardly from driving portion 276 of the shutter.

If desired, a spring detent may be provided to hold the control mechanism in the S—4 or back-winding position, such mechanism being similar to that provided by the detent previously described which holds the control mechanism in the S—5 position. Such a holding device is not recommended, however, since the back-winding operation is relatively seldom used and only for a short period. There is, therefore, no good reason why the parts should be left locked in that position.

As stated in the fourth heading hereinbefore, the driving connection between the back-winding handle and the delivery spindle is broken except under conditions wherein the gate is closed, the light-trap disposed in its second or operative position, and the meter either unlocked or its significant driving or driven gear rendered accessible to a co-operating gear carried by the apparatus. As previously described and as shown in Figure 32 (sheet 3), the back-winding knob 39 is mounted upon the cover. Therefore, when the cover is in open position, driving cross bar 34 cannot engage the spindle to drive it in a back-winding direction. As will presently appear, under such conditions when the cover is open, the gate members are maintained in spaced relation, the light-trap of a magazine within its compartment maintained in its first or protective position and the meter locked or rendered inoperable. Under these conditions, therefore, it is impossible to feed the film. When the cover is closed, however, all of these parts are replaced in running position and it is again possible for the user to operate the delivery spindle in a back-winding direction.

As previously stated, the back-winding of the film is desirable so that a second set of pictures by double exposure may be imprinted upon a section of the film which has already been exposed. In order that portions of two frames are not spoiled or injured as forward exposing commences again, it is desirable to begin a re-projecting operation with the film accurately framed at the aperture, so that the first exposure of the second series will be imprinted upon one frame and not two. To this end, mechanism which is shown in Figure 31 (sheet 3) and later described may be employed. In order to make certain that the film is properly framed after a back-winding operation, all that the user has to do is slightly to open the cover of the apparatus and then immediately close it again. This movement will frame the film, as will be evident from a later portion of this specification.

We shall next describe the general control mechanism which is illustrated in Figures 22 to 26 both inclusive by means of which the final portion of the cover-closing operation, first, retracts the light-trap (and, if desired, accurately frames the film); second, places the edge guide in film contacting position; third, renders the meter of the magazine connectible with the meter of the apparatus (or unlocks it); and, fourth, closes the gate. Conversely, the initial portion of the cover-opening operation moves all the above parts from their film exposing to their threading positions by, first, opening the gate; second, withdrawing the edge guide; third, replacing the light-trap in protective position; and, fourth, covering the operating mechanism of the meter upon the magazine so that it cannot be tampered with while the magazine is out of the camera or, alternatively, blocking its operation. Since both of the above series of operations must be accomplished very quickly in order to prevent the possibility of light leakage or injury to the film by its premature or prolonged engagement with the film engaging parts in their operative positions, this control mechanism is operated at relatively high speed at the instant before the cover is completely closed and at the instant the opening operation commences. To this end, the control mechanism is set by the closing of the cover for instant release by the opening operation and vice versa.

We shall first describe the mechanism associated closely with the above parts for moving them as stated above and thereafter the mechanism which operates that mechanism.

Movement of a main control cam slide 351 is the basis of the above operation. In a manner later to be described in detail, the final portion of the cover closing operation moves this slide from the position of Figures 23 and 25 to that of Figures 22, 24 and 26, while the first portion of the cover opening operation moves it in the opposite direction. This plate is constructed generally in the shape of a squarely formed letter A with a top cross bar 352, two upright side bars 353 and 354 respectively, and a middle cross bar 355. This cam plate slides between side guides 356 and 357 which are disposed immediately below the floor 14 of the film compartment C and above the main transverse supporting plate 252. Three pins, 194, 360 and 361 extend downwardly from the light-trap, edge guide and movable gate section respectively, to engage slots 363, 364 and 365 respectively formed in this plate.

Pin 194 projects through a cam slot 367 cut in the floor 14 of film receiving compartment C and downwardly into engagement with the cross slot 363 in cam slide 351. A shoulder 368 of this pin by engagement with floor 14 and a nut, not shown, on the lower end of the pin holds it in place. As cam slide 351 is moved from the position shown in Figures 23 and 25 to that of Figures 24 and 26, the first phase of the movement through the straight portion of the slot will be effective to move the light-trap 180 across the gate receiving recess, while subsequent movement through the camming portion of the slot moves it forwardly in the delivery pocket 181, thus preventing contact between the light-trap and the fixed gate plate 57 and fingers 64 and 65. The leading end of tube 180 is guided by contact with the back wall 183 of the delivery pocket and the trailing end is moved forwardly against the influence of U-shaped plate 184, thus at the conclusion of the operation placing the light-trap in straight lined relation with the path through which the film is fed. Also, plate 184 operates the meter cover or lock as stated. As pin 360 moves in the straight part of slide 364, edge guide 69 remains motionless in order to permit light-trap 180 to clear the portion of the film receiving compartment which it is about to occupy and to expose the film. Movement through the camming portion of this slot, however, moves the edge guide backwardly and permits its upward movement, in the manner previously explained, into contact with the lower edge of the film.

Similarly, pin 361, which controls the movable section of the gate, as it moves through the straight portion of cam slot 366 is without effect until the light-trap and edge guide are in their second or running positions. Thereupon the camming portion of this slot guides the pin to close the gate.

As will best be seen from a consideration of Figures 16 and 23, cam slot 366 is provided with an offset portion 371 teminating in an enlargement 372. The long leg 63 of the L-shaped support for the movable gate section is removable through these openings so that the pressure plate 60 may be periodically cleaned. Control pin 361 is formed with a shoulder 376 which normally holds the slide in place in the slot 377 in bearing plate 252. Another pin 379 is mounted upon a leaf spring 380 which is attached to the under side of plate 252. This pin extends upwardly through an opening in plate 252 and guide 357. When the parts are in the position shown in Figure 23, if pin 379 is depressed, plate 62—63 can be moved rearwardly with pin 367 sliding within openings 371, 372, 377 and 378 until the shoulder 376 reaches the recess 372 in alignment with openings 372 and 378. Thereupon the slide with the resilient film engaging section 60 can be lifted out of the apparatus.

Movement of the main cam slide 351 between the positions shown in the drawings is accomplished by a series of slides, springs and latches, all under the influence of the movement of the cover, which will next be described.

Movement of cam slide 351 in each direction is immediately under the influence of two U-shaped slides, an upper slide 390 and a lower slide 391 which fits and moves therewithin. By reason of this construction, it will be seen that when the two slides are positioned co-extensively, they form a tube which is quadrilateral in cross section, as seen in Figure 22. The lower slide 391 may be moved longitudinally within the upper slide, and thereafter the upper slide is released to follow it to its new position wherein a quadrilateral tube is re-established. During such movements, each slide acts as a guide for the other. Tube 390 by means of a downwardly extending block 392 is attached to cross member 352 for movement therewith and with main control plate 351. Depending in turn within the cross-sectional area of each slide and attached to upper slide 390 but extending between the upstanding legs of lower slide 391 is a lug 393 to which one end of a main tension spring 394 is attached. The function of this spring is to place the film handling mechanism in operative condition. The other end of this spring is attached to an upstanding main operating pin 395, the lower end of which is engageable with and movable by a rotatable arm 396 which is pivoted upon a pin 397.

Means by which this arm 396 is rotated and the control mechanism hereof operated will later be described. Formed upon and movable with arm 396 is an offset and upstanding arm 398 which at all times at which the cover is open engages detent spring 308 of the movement control mechanism and holds it in inoperative position thereby making certain that the film moving mechanism cannot be operated except when the cover is closed. Movement of this arm counterclockwise, as shown in the figures, does not affect upper sleeve 390 because of the recess 399 formed in the edge thereof. When this operating pin moves in the other direction, engagement between it and this recess moves the upper slide and the main cam slide 351 in the direction shown by the arrow of Figure 24. Pin 395, however, is fixedly attached to lower sleeve 391 for movement therewith. This operating pin 395 is guided in its movement by a slot which is formed in part in plate 46 and in part in plate 252.

The upper slide 390 is held in the position shown in Figures 23 and 25 by a latch which includes a spring detent 404 which is attached to plate 46 with its rightward end as viewed in Figures 23 and 25 engaging a leftward edge of slide 390. As pin 395 is moved counter-clockwise to operate the control mechanism, slide 390 and members actuated by control plate 351 remain motionless under control of this latch until just before pin 395 has completed its movement to the position shown in Figures 24 and 26. This operation is effective to place spring 394 under tension. At the instant of approach to completion of this movement, an inclined lug 405 projecting from and preferably formed from the side of lower slide 391 engages the forward face of detent 404 and cams it out of holding relation to slide 390. Upon the release of slide 390, the tension of the spring 394 is released and control plate 351 is quickly snapped from the position shown in Figures 23 and 25 to that shown in Figures 24 and 26. At that instant, however, a latching member 407 projecting (and preferably formed) from upper slide 390 engages an upstanding formation of a latch plate 408 (Figure 26) which is pivoted at 409 against the influence of a spring 410. This mechanism is clearly shown in Figure 26, but for clarity omitted from other similar figures. The result of this engagement is that the various members are locked in the position shown in Figures 18, 24 and 26. The movement above described has also been effective to place under tension a main return spring 412, one end of which is attached to pin 395 and the other end of which extends to bracket 402 which supports plate 46. The release of this spring, as will be readily understood, by co-action of pin 395 and recess 399 and upper slide 390 moves the control mechanism from the position of Figures 24 and 26 to that of 23 and 25 upon the opening of the cover. As such movement takes place, an irregularly shaped blocking projection 414 (for clarity not shown in Figures 23 and 24) extending backwardly or to the right as shown in Figures 25 and 26 engages and blocks the upstanding and co-operating blocking projection 291 formed on control arm 286 which governs this movement of the film, thus making it impossible for a film to be run.

To complete a description of this control mechanism, it is necessary to explain, first, how shaft 397 is rotated in a counter-clockwise direction; and, second, how latch 408 is released. The first of these operations takes place when the cover is closed and the second when it is opened.

An irregularly shaped setting arm 415 is rotatable upon a pintle 416. At one end, this arm is upturned into a lug 417 which engages and moves arm 396 and hence pin 395. At the other side of its pintle, this arm has a bevelled portion 418 the utility of which will later appear. Setting pin 419, as is best shown in Figures 18, 23 and 25, is mounted upon a leaf spring 420 which is attached to a long leg 421 of a T-shaped actuating plate having a short cross bar 422. This cross bar in effect forms a part of the front wall 15 of the film receiving compartment C and is moved by the cover when it is closed. Below the leaf spring, the long leg of the T is cut away so that the spring 420 may move upwardly and downwardly, as shown in Figures 18 and 23 to 26, both inclusive. The leaf spring and the pin attached thereto are so disposed that the pin moves in a cylindrical opening 423' which is cut in the cross bar of the T to serve as a sleeve which both guides and communicates force to the pin. The mounting of the pin on the leaf spring is necessary in order that it may be moved along the short axis of the T to clear the arm 415 when the parts are moved from the position shown in Figures 24 and 26 to those shown in Figures 23 and 25. As the T-plate, by the closing of the cover as later described, is moved from the position of Figures 23 and 25 to those of Figures 18, 24 and 26, pin 419 engages a side of arm 415 and thereby moves it in a counter-clockwise direction. Through lug 417, arm 396 and pin 395 are thereby moved counter-clockwise and the results previously stated are obtained.

As shown in Figures 25 and 26, movement of the long leg 421 of the T-plate from the operating to the threading position causes a spring-pressed latch control member 423 mounted thereupon which, by the previously described movement of the T-slide upon the closing of the cover, has been placed in engagement with one of the serrations 424 of latch 408 to rotate upon its pintle 409 in a clockwise direction thereby releasing the latch which holds the control sleeves 390 and 391 in running position. Thereupon resetting spring 412 moves the parts from the position shown in Figures 18, 24 and 26 to that shown in Figures 23 and 25. In order to prevent interference between the arm 415 and pin 419 during the movement, the lower end of this pin by contact with bevelled surface 418 has been raised against the pressure of the leaf spring upon which it is mounted so that the arm can readily snap over.

The long leg 421 of the actuating T-plate is guided by a pin 426 fastened thereto and working in a slot 427 in the floor 14 of the film compartment C and also by edge plates 14, 252 and 356 which engage a slot 428 cut in the leg of the T. As best shown in Figure 22, an actuating spring 429 housed below the floor of the film receiving compartment C extends from a convenient point of attachment upon shaft 318 to this pin 426 in order to release slide 390 and main return spring 412 thereby placing in threading position the above described parts associated with the film and returning the T-plate to its position of Figures 23 and 25. The movement of the cover, as explained below, alternately expands and releases this spring.

As will best be seen by Figure 1, operating movement is communicated to this T-slide by a quadrant 434 which is attached to the upper rim 19 of the cover of the apparatus. Thus as the cover is closed, quadrant 434 engages and moves the T-slide 422 and carries out the operations precedent to film feeding which are above described including the placing of spring 429 under tension and causing latch control member 423 to engage latch 408 ready to release slide 390 when the cover is opened. Such opening operation releases latch 408 thereby returning the various operating parts above noted to the threading position.

To summarize the above operations:

As the cover is closed, the T slide moves forwardly, that is, downwardly as viewed in Figures 23, 24, 25 and 26, two series of operations may be said to take place. First, main operating spring 394 and main return spring 412 are set by the movement of lower slide 391 away from upper slide 390. Actuating spring 429 is also extended and is held in extended position as long as the cover remains closed. Second, operating spring 394 is released at the conclusion of the cover closing movement thereby snapping main control plate 351 into running position and instantly moving all of the above-mentioned operable parts from threading to running position. Main return spring 412, which is attached to slide 391, and also spring 429 remain extended ready to return the apparatus to threading condition. Thus the first part of the cover closing movement sets the main control apparatus both for moving the parts to running position and for later returning them to threading position and the final portion of the movement of the cover quickly places them in running position. This second portion of the movement also unblocks the film feed. The opening of the cover immediately releases spring 412 which returns the parts to threading position and makes the main control mechanism ready for another cycle.

Among the important objects of our invention is the provision of control mechanism which is set for operation by the first portion of the closing movement of a cover of a film receiving compartment and released for instant operation by the concluding portion of such movement. Another important characteristic is the setting by a cover closing operation of mechanism which moves film engaging parts of a camera from running to threading position and the release by the first portion of a subsequent opening of the cover of the mechanism which has been so set.

As previously stated in connection with Figure 16, we also apply our invention to apparatus which alternatively accommodates two films both relatively of wide width and one disposed within a magazine and the other upon reels. Mechanism for accomplishing this end is shown in Figure 27. In certain of its aspects it corresponds to that shown in Figure 16.

As is shown in Figure 27, a movable pressure plate 460 is carried by a supporting leg 462 of a movable gate structure similar to that previously described. Opposite thereto, a fixed gate structure is provided. It includes a film contacting member 464, an opening 465 to receive a film operated metering sprocket, and a forwardly offset supporting formation 466. Leg 462 of the movable gate section has a right-angled extension 473 which in a relatively long bearing supports a rotatable shaft 474. Mounted on this shaft is a sprocket 475 which as movable gate section 460 is moved to closed position engages a film 88f in line with its perforations, this film being housed within a magazine MM. It will be understood that the threading operation is the same as that previously described. When the gate is in open position, the magazine is dropped into position and the film thereupon passes between the movable gate section 460, then retracted, and the fixed gate section 464. As the film begins to move a tooth of the sprocket will slip into a perforation if it has not already happened to coincide with one. If desired, a spring-pressed pressure plate may be disposed within the opening 465 opposite the sprocket, with an aperture into which the teeth respectively fit, as the sprocket revolves under the traction of the film. Thus sprocket 475 is rotated in one direction by forward movement of the film 88f as it is coiled upon a take-up spindle, not shown, or in the other direction as it is back-wound upon a delivery spindle, likewise not shown.

A single-toothed gear 476 is also mounted upon shaft 474 for revolution therewith. As the gate is closed, this tooth meshes with gear 477 which rotates on a stub-shaft 478 suitably supported by a right-angled extension 466 of the fixed gate section. Coaxially mounted on gear 477 for movement therewith, is a one-toothed gear 480. When the cover 17' is closed, a gear 481 attached thereto by stub-shaft 482 meshes with gear 480. At its opposite end, this shaft carries a plate 483 bearing indicia. A leaf spring 486 surrounds shaft 482 and bears against both the indicia plate and the cover to prevent unwanted movement and yet to permit manual re-setting as previously described in connection with Figure 14. Plate 483 is set within an annular opening in a disc 490. The above construction is such that rotation of plate 483 rotates disc 490 but one may be manually moved relatively to the other.

By reason of the above construction, it will be evident that a film which is disposed within the gate of the apparatus, whether supported by open reels or housed within a magazine, will operate the above-described meter. This construction differs from that shown in Figures 14, 15 and 16 in that, first, in Figure 16 a sprocket within the magazine adapted for relatively narrow film drives both a meter upon the magazine and, second, that meter in turn drives a meter upon the apparatus when such a magazine is disposed within its film-receiving compartment. In the construction of Figure 27, however, a sprocket upon the apparatus is engaged by a film of relatively great width when supported in a magazine and drives a meter upon the apparatus. That meter in turn and by mechanism which is about to be described drives a meter which is disposed upon the magazine, so that it is possible for the user to have a record which is available upon the outside of the camera while the magazine is in use therewithin and also upon the magazine itself when it is taken from the camera.

To drive the meter of the magazine by the meter of the camera, a gear 492 is attached to a shaft 493 which depends from cover 17' of the camera. As the cover is closed, this gear meshes with a gear 494 rotatable upon the magazine MM and corresponding to disc-gear 160 of Figure 7. The meter which is driven by this gear is similar to that of Figure 7 in every respect except that the means for driving it by the film including the sprocket 168 and the motion-transmitting train between it and the gear, of course, are omitted. Consequently, it is not necessary again to illustrate or describe it.

Film-metering devices previously described are so constructed that if a user wishes to base his calculations upon the amount of film which he has previously exposed in a magazine it is necessary for him at the time he places a partly used magazine in his apparatus to set the meter of the apparatus to agree with the meter of the magazine. We also provide mechanism whereby a meter of a camera is automatically set to agree with the registration of the film which previously has been exposed in any magazine which may be placed in the apparatus. Mechanism to accomplish this result is illustrated in Figures 28 and 29.

According to this embodiment of our invention, we provide upon each camera an actuating member in the form of a cam driven by a double eight film, for example, which serves as the basis for the registration of the amount of such a film which has been exposed. Upon each magazine accommodating, for example, a single eight film for alternative use within such a camera, we provide another actuating member in the form of a cam operated by the film within the magazine and serving as the basis for the registration of the amount of such film which has been used. A dial upon the camera is operated by whichever actuating member at any particular time is being rotated by the film which is in use. Thus we provide a single dial which is operated by whatever film is currently employed. As previously pointed out, such arrangements can also be applied to films differing in characteristics other than width.

A magazine M' may carry upon it a film-registering device which is shown as actuated by a gear 511. This gear corresponds to gear 164 of the structure of Figures 7 and 8 and may be driven by the film in the manner therein illustrated and previously described. Consequently, it is unnecessary to repeat that description. This gear in turn operates a disc-gear 512 rotatable upon a shaft 513 and carrying indicia 514. A cover 515 is provided having an oblong relatively long window 516 which both permits the indicia to be observed and also allows the introduction of a feeler, later described, which operates a meter which is disposed upon the camera. If desired, a cover such as that previously described may be provided for this opening, this cover having a transparent portion permitting the indicia to be visible. In such instance, we prefer to operate this cover automatically as described in connection with Figures 7, 8 and 9 by a connection with a light-trapping tube such as 180 previously described since it is necessary that when the magazine is within the camera a portion at least of this window be open. In Figure 29 we show a light-trapping tube 521 corresponding to tube 180" of Figure 1 and operable as explained in connection therewith but it will be understood that if a cover is desired, the construction preferably should be that of Figures 7, 8 and 9.

We shall next described mechanism for operating a meter of a camera with which the above described magazine is associated. To this end, an irregularly shaped cam 522 is rotatable with shaft 513. The locus of the camming surface is a spiral which may be plotted according to the following formula:

$$r = \frac{X \ (R' + R) \ R}{X}$$

Let R equal the shortest radius at that point on the periphery of the spiral at which the meter records a zero amount of film. Let R' equal the longest radius at that point on the periphery of the cam at which the meter records a maximum amount of film moved, for instance, fifty feet. Let X, which for practical reasons must be less than 360 degrees and may, for example, be 350 degrees, equal the number of degrees of angular rotation of the cam structure between the locus of radius R and radius R'. Let r equal a radius after the cam has been rotated through X degrees.

It will thus be seen that the periphery of the cam or spiral is plotted outwardly from a point relatively adjacent its center in an arithmetical progression relative to the angular rotation of the cam as it is rotated from the zero point to the maximum point. Or, if desired, rotation may be in the opposite direction.

The length of opening 516 is such that at all points of rotation the periphery of the cam is available for engagement by a feeler later described.

An actuating mechanism of a meter upon the camera when under the influence of a film disposed upon open reels may be driven in the manner shown in Figure 16 or, alternatively, in Figure 27. A single-toothed gear 525 may be driven by a sprocket corresponding to sprocket 75 or sprocket 475 as previously described. As the cover 17" of a film compartment is closed, this one-toothed gear meshes with a gear 526 revoluble upon a shaft 527 mounted upon the cover. Positioned upon shaft 527 is a cam 528 which is formed in the manner previously described. The camming surface of this member, through a feeler member later to be described, operates a metering device placed upon the camera cover when a film positioned upon open reels is used.

Each time the cover is opened, it is desirable to return this operating cam for the meter upon the camera to its zero position. Mechanism such as that previously described may be employed. A pinion 530 is co-axially mounted on gear 526 for movement therewith. This pinion is engaged and operated by an L-shaped arcuate latch 531 which is pivoted at 532. The short leg of this latch is formed into a rack 529 engaging the pinion. The opening of the cover 17" moves this rack in a counter-clockwise direction while rotation of either dial through mechanism later described moves it idly in the other direction. In order that movement of the cover may re-set the dial upon the camera (but not that upon a magazine in use therewith), a headed pin 534 is attached to the latch member and works within a slot 536. An L-shaped control slide 537 is formed with a right angled lug 538 which engages the front wall 15' of the film compartment, indicated as C', thereby, through co-action between pin 534 and the end of slot 536 moving the L-shaped member in a re-setting direction. This slide is supported by a strap 541 attached to the cover and by the headed pin. To provide constant engagement between this operating pin to move the control slide 537 in a re-setting direction, a spring 542 extends between a pin 543 and pin 534.

The registering device itself consists essentially of a light slide 550 movably attached to the under side of the cover 17" of the camera by edge guides 552. An opening 553 in the camera cover is protected by transparent material having a sight line 554 and makes visible a scale 555 diagonally marked upon the outer surface of the slide. This slide is moved forwardly or to the left as viewed in Figure 28 as by a spring 556.

The forward portion of this slide is formed with three operating extensions—a camera feeler finger 557 adapted to co-act with cam 528 indicating the amount of film fed by or within the apparatus; a magazine feeler finger 558, which extends well below the cover as well as forwardly, which engages the cam 522 mounted upon the magazine; and a re-setting finger 559. This re-setting finger is for the purpose of moving the dial plate backwardly or to the right as viewed in Figure 28, so that the feeler fingers 557 and 558 will be so retracted that when the cover is closed they will be positioned beyond the spiral surface of their respective cams.

Co-operating with this re-setting finger is an operating arm 562 having a slot 563 working therein attached to the cover of the camera. This arm also has a right angled lug 566 at its end which is positioned to bear against the front wall of the camera when the cover is closed. A spring 567 extending between guiding pin 564 and a point upon the arm backwardly thereof or to the right as shown in Figure 29 normally moves this arm forwardly or to the left as viewed in Figure 28.

When the cover is opened, upstanding lug 566 is removed from contact with the wall of the film compartment and consequently arm 562 under the influence of spring 567 moves forwardly or to the left. It carries with it a leaf spring attached to a backward or rightward end and formed into a latch 568. This latch is mounted upon a side of the operating arm adjacent a side of re-setting finger 559. When arm 562 has been moved to its extreme forward or leftward position as the cover is opened, this latch engages the forward or leftward end of re-setting finger 559. When the cover is closed, lug 566 again engages the side wall of the film compartment and is thereupon by the cover-closing movement pushed backwardly or to the right, carrying with it re-setting arm 559 and, of course, dial plate 550. This movement carries the feeler fingers 557 and 558 backwardly beyond the surface of magazine cam 522, irrespective of the position to which it may have been rotated. At this point, the apparatus cam will have been returned to zero position. Thereupon a leading end of latch 568 engages a pin 571 placed in the cover and is depressed, thus breaking the connection between control arm 562 and re-setting arm 559. Consequently, spring 556 thereupon moves indicating plate 550 until the feeler finger 558 engages the surface of its cam. Consequently, feeler finger 558 engages its cam wherever previously it may have been set and thus dial plate 550 registers the amount of film which already has been exposed in that particular magazine.

In this and other embodiments of our invention, we have shown mechanism for moving to a zero position footage recording dials which are disposed upon a camera. It should be emphasized that in this and in all other forms of our invention this feature may be omitted if desired. It is particularly to be noted that the automatic mechanism of Figure 28, by means of which actuating fingers for a recording dial are moved to a position wherein they clear the cam surfaces which operate them, makes it possible to dispense with the re-setting of an actuating member by the movement of the cover particularly in those instances in which one of our improved meters is employed without the other.

In the above and other embodiments of this invention, we have described footage recording devices particularly adapted for use with apparatus which accommodate films differing in width or other characteristics, or with films disposed upon carriers of different characteristics. As previously stated, meters as described herein are particularly applicable to a film handling apparatus in which a film may be back-wound. It will be readily understood, however, that our invention is in no way limited to use with apparatus or magazines of those or other particular characteristics described herein. Included among the objects of our invention, therefore, is the provision of improved footage recording devices, whether or not for use with apparatus which is adapted to handle films having similar characteristics or to move a film in one direction only.

In the construction which is shown in Figures 7, 8, 9 and 27 and described in connection therewith, we have shown means whereby a meter disposed upon a magazine but operated by or operating a meter disposed upon an apparatus and therefore having normally exposed motion-transmitting elements may be protected by a cover which is automatically moved so as to protect such exposed parts when the magazine is outside of its compartment in the camera, and automatically moved back again to expose such parts after the magazine has been replaced within the camera. Alternatively, we show in Figure 30 means whereby such a meter on a magazine may be locked whenever the magazine is removed from the camera and unlocked whenever it is placed therewithin. As previously, we prefer to operate such a structure by the movement of a light-trap but alternatively it may be operated by a direct connection with main control mechanism such as that previously described herein.

Upon a magazine 575, which otherwise may be constructed as previously described, there is disposed a shaft 576 corresponding to shaft 161 of Figures 7 and 8. A disc-gear 577 rotates upon this shaft. This gear corresponds to disc-gear 160 of Figures 7 and 8 and may be operated in accordance with the previous embodiments of this invention. It may either be driven by the film and hence directly record the film exposed (or remaining) and also operate a meter disposed upon the apparatus; or, alternatively, it may be driven by a film-registering device of the apparatus with which it is used. In either such case, a gear 579 disposed upon a camera and operable upon a shaft 580 engages with it. Such engagement is permitted by a recess 582 formed in a cover plate 583. It should be recognized, however, that this form of our invention may be applied to meters for magazines in which there are no exposed parts in such cases as it is considered desirable positively to lock the members in position when the magazine is outside the camera.

Movable with gear 577 or formed as a part thereof is a disc 585 having teeth 586 which may be engaged by a projecting point 587 of a locking pawl 588. Alternatively to this construction two co-operating milled surfaces or any desired co-operating locking surfaces may be provided. Pawl 588 is rotatable upon a pin 589 fastened to the magazine and normally urged in a clockwise direction by a spring 590. A portion of this pawl extending forwardly or to the left as viewed in Figure 30 has an operating formation 591. We prefer to employ movement of a light trap 595 to move this pawl against the power of spring 588 to locking position, the power of the spring being effective to move it to unlocking position.

Such a light trap may be similar to that shown in Figures 3, 4 and 7 and those associated therewith. In any case, it is automatically moved by the closing of the cover or the operation of a cover latch between a first or protective position and a second or running position. As clearly seen in Figure 30, when in the protective position, the end of the light-trap is disposed in a take-up pocket 596. Movement to this position causes the engagement of the lower or leading edge of the light-trap and the operating formation 591 of the pawl. This movement rotates the pawl anticlockwise and causes its point to engage a serration of disc 585, thereby locking the meter against movement or alternatively operating such other locking instrumentalities as may be used. On the other hand, movement of the light-trap from the protective to the open position will free locking disc 585 from the pawl by the action of spring 590 so that the meter may be operated in the manner desired.

As previously stated, it is highly desirable under many conditions to make certain that the film is accurately framed at the exposure aperture when the operation of the apparatus is begun or after a back-winding operation. In either case, such accurate framing prevents a loss of film through simultaneous exposure of parts of two frames and also protects the film from physical damage because the first movement of a claw (or sprocket, if one is employed) immediately engages a perforated instead of an unperforated portion of the film. No film is wasted or physical injury caused while a tooth is groping for a perforation. This provision is particularly desirable in connection with a back-winding operation.

As is shown in Figure 31 (sheet 4), we supply a light-trapping tube 611 which may be of any of the types described herein. For convenience, we are illustrating the tube as similar to that of Figures 11, 12 and 13. The tube is moved between a second or running position as shown in Figure 31 and a first or protective position (not shown) by means previously illustrated and described or to which reference has previously been made.

Mounted upon the rear or righthand side, as shown in Figure 31, of this tube is a resilient member 612 having a relatively long body portion which terminates in a claw 613 which operates through an opening 614 in the back wall of the light-trapping tube. Midway between the claw and its point of attachment to the tube, a camming deformation 616 is formed. Co-operating with this camming portion of the claw is a forwardly facing camming indentation 617 formed in the forward or righthand portion, as shown in Figure 31, of back wall 618 of delivery pocket 619 of the magazine. By reason of the above construction, it will be evident that when tube 611 is moved from the first or protective position, not shown, to the second or running position, such movement being upwardly as shown in Figure 31, tooth 613 will be cammed forwardly into engagement with a perforation 620 of a film $f$ by co-action between camming surfaces 616 and 617. As will be evident from the foregoing description and from an examination of Figure 31, this movement of claw 613 will move the film with it until the claw is cammed out of operative relation with the film. Camming surface 617 is greater in length than the distance between two perforations. The upper end of camming surface 617 is so disposed in relation to the position of the claw or claws at the gate that when the resilience of arm 612 snaps tooth 613 away from perforation 620, thereby rendering the film motionless, a perforation will be positioned immediately opposite the working position of each tooth, such, for example, as that of positioning claw 64.

Our mechanism above described may be employed as a framing device with a film which carries only conventional perforations primarily intended for a regular film feeding operation only when such perforations upon each side of the film are spaced one to each frame. Such arrangement of perforations is now, practically speaking, universal for films intended for amateur use. This device may be used with a film, such for example as one of thirty-five millimeters in width which is standard for theatrical use, provided special framing perforations are provided, as for example in a leader, one to each frame. Irrespective of the framing operation, however, this phase of our invention is useful with a film having a plurality of perforations for each film in that its use disposes a perforation opposite a tooth prior to the beginning of an exposing or projecting operation, thus protecting the film from the possibility of physical damage, even though parts of two frames may be in alignment with the aperture.

The advantages of this invention as well as its characteristics and objects will be evident from the foregoing specification, the attached drawings and the subjoined claims. Important among them is the provision of improvements upon the several co-pending and other applications which have been identified in this specification, of course including our parent Patent Number 2,351,088.

We wish particularly to emphasize that the objects and advantages of the various embodiments of our invention lie in the elements and combinations as well as the combinations which are claimed and that, while we have elected to describe our invention as embodied in complete and highly developed apparatus, many of its most important parts may well be employed other than in such an apparatus or in association with other features hereof.

Although we have illustrated our invention by describing its embodiment in a camera and magazines for light-sensitive film, we wish it particularly understood that it may be employed in many other types of film handling apparatus. As previously indicated, our invention may be applied to apparatus for sound reproduction, such as a film playing phonograph. It will be readily understood that in such instances a continuously operating film advancing member will be substituted for the above-described intermittent pulldown. Consequently in the claims the terms "intermittent pull-down" is to be taken to include a member which continuously advances a film, as for sound reproduction or recordation.

We claim:

1. In combination, a film handling apparatus and a magazine for use therewith; said magazine having a delivery support and a take-up support, a gate receiving recess therebetween, a film extending in an operational path between said supports and across said recess, a light-trap surrounding the length of film extending across the recess of said magazine and movable from a first or protective position there-across wherein it protects the film from light and a second or running position out of said recess and within the magazine wherein it frees the film, said first position being between said operational path across said recess and the body portion of the magazine and said second position being within the magazine and coextensive with a portion of the film path, a meter for registering the amount of film which is exposed therein, and a device for preventing the operation of said meter; said apparatus including a gate for defining said operational path, said gate comprising a fixed section and two sections movable relatively thereto, a first of said movable gate sections having a film engaging surface parallel to that of said fixed gate section and being adapted to engage a side of the film and a second of said movable sections having a film engaging surface normal to said film engaging surfaces and being adapted to engage an edge of the film, means for moving said first movable section from a threading position relatively distant from said fixed section and said path to a running position relatively adjacent said fixed section wherein it engages the film supported by said magazine and extending across said recess and defines a side of said path opposite that defined by said fixed section, means for moving said light trap from its said first to its said second position, means for moving said second movable gate section into operating position wherein it engages both of said sections and an edge of the film in order to guide it and supply an edge of said path, a pull-down claw engageable with the film for intermittently moving it through the gate, a positioning claw engageable with the film for holding it motionless within the gate, means for disabling said means for preventing the operation of said meter thereby rendering said meter operable, mechanism for back-winding the film through the gate in a direction contrary to that through which it is fed by said claw, means for clearing the gate for the free passage of the film by removal therefrom of a toothed member prior to the back-winding of the film, a film engaging member for moving the film to bring it into alignment with the aperture of said gate, means for operating said aligning member, and sequential control mechanism operatively interconnecting all of said means and including instrumentalities for successively actuating each thereof.

2. In a film handling apparatus, a gate, said gate comprising an apertured fixed section which defines one side of the operational path of a film in the apparatus, a section in spaced parallelism therewith movable from a first or threading position relatively distant from said fixed section to a second or running position relatively adjacent said fixed section wherein it defines the other side of said path and engages a film disposed therein and between said sections, and an edge guiding section movable from a first or threading position relatively remote from the film to a second or running position wherein it engages an edge of the film in its operational path to hold it in correct lateral relation to its path through said gate, cooperating formations for guiding said edge guide in its movement from said first to said second position, said formations first directing said edge guide forwardly in a direction parallel to the optical axis of the aperture of said fixed gate section but laterally spaced from the edge of the film and thereafter directing said edge guide toward said optical axis and into engagement with an edge of the film, and sequential control means operatively interconnecting said movable gate section and said edge guide and including instrumentalities for first operating said edge guide and second moving said movable gate section from said first to said second position.

3. In a film handling apparatus, a gate, said gate comprising an apertured fixed section which defines one side of the operational path of a film in the apparatus, a section in spaced parallelism therewith movable from a first or threading position relatively distant from said fixed section to a second or running position relatively adjacent said fixed section wherein it defines the other side of said path and engages a film disposed therein and between said sections, and an edge guiding section movable from a first or threading position relatively remote from the film and its path to a second or running position wherein it engages an edge of the film to hold it in correct lateral relation to its path through said gate, cooperating formations for guiding said edge guide from said first to said second position, said formations first directing said edge guide forwardly in a direction parallel to the optical axis of the aperture of said fixed gate section but laterally spaced from the edge guide of the film and thereafter directing said edge in a direction toward said optical axis and into engagement with an edge of the film, and means for moving said edge guide from said first to said second position.

4. In combination, a film handling apparatus and a magazine; said apparatus having a film receiving compartment, a fixed gate section which projects within said compartment thereby defining the focal plane of the apparatus and engaging one side of the film and forming one side of the operational path of the film, and a movable gate section disposed in said compartment in spaced parallelism to said fixed gate section and movable to a position wherein it engages the other side of the film and forms the other side of the operational path of the film, an edge guide movable to a position within said compartment wherein it engages an edge of the film as the film is disposed in its operational path between said fixed and movable gate sections, said gate sections and said edge guide being so disposed that when a magazine is placed within said compartment they are positioned adjacent a film supported by said magazine; said magazine having a gate receiving recess across which the film extends in alignment with its operational path, a light-trap which surrounds the film and extends across said gate receiving recess, said light-trap being disposed between the operational path of the film and the body of the magazine so that when said magazine is placed within said compartment it clears said projecting fixed gate section, and sequential control means operatively interconnecting said light-trap, said edge guide and said movable gate section and including instrumentalities for first moving said light-trap away from light-trapping relation to the film thereby freeing it for engagement with said fixed gate section and movement into its operational path and second moving said edge guide into guiding relation with an edge of the film and third moving said movable gate section into closed position.

5. In combination, a film handling apparatus and a magazine; said apparatus having a film receiving compartment, a fixed gate section which projects within said compartment thereby defining the focal plane of the apparatus and engaging one side of the film and forming one side of the operational path of the film, and a movable gate section disposed in said compartment in spaced parallelism to said fixed gate section and movable to a position wherein it engages the other side of the film and forms the other side of the operational path of the film, said gate sections being so disposed that when a magazine is placed within said compartment they are positioned adjacent a film supported by said magazine; said magazine having a gate receiving recess across which the film extends in alignment with its operational path, a light-trap which surrounds the film and extends across said gate receiving recess, said light-trap being disposed between the operational path of the film and the portion of said recess adjacent the body of the magazine so that when said magazine is placed within said compartment it clears said projecting fixed gate section; and sequential control means operatively interconnecting said light-trap and said movable gate section and including instrumentalities for first moving said light-trap away from light-trapping relation to the film thereby freeing it for engagement with said fixed gate section and movement into its operational path and second moving said movable gate section into closed position.

6. In combination, a film magazine having a gate receiving recess, a delivery guiding channel directing a film to said recess, a take-up guiding channel aligned with said delivery channel for directing the film from said recess, the film bridging said recess, said channels and the space directly therebetween forming portions of an operational path for the film, and a movable light-trap surrounding the film as it bridges said recess, guides for disposing said light-trap in a position which lies between the operational film path and the body of the magazine, and means for moving said light-trap from its position across said recess to another position within the magazine in line with the film path.

7. In combination, a film handling apparatus and a magazine for use therewith; said film handling apparatus having a compartment for the reception of said magazine and a member which extends therewithin and into the operational path of the film to engage the film; said magazine having a recess across which the film passes in engagement with said film engaging member when the magazine is disposed within said compartment, and a movable light-trap surrounding the film as it extends across said recess, said light-trap being movable between a first or protective position across said recess wherein it is disposed between the operational path of the film and the body of the magazine and a second or running position wherein it is disposed within the magazine and in said path; and means for moving said light-trap to said second position.

8. In combination, a film handling apparatus and a magazine for use therewith; said film handling apparatus having a compartment for the reception of said magazine, a member which extends therewithin and into the operational path of the film to engage the film, a magazine receiving compartment, and a cover for said magazine receiving compartment; said magazine having a recess across which the film passes in engagement with said film engaging member when the magazine is disposed within said compartment and a movable light-trap surrounding the film as it extends across said recess; said light-trap being movable between a first or protective position across said recess wherein it is disposed between the operational path of the film and a second or running position wherein it is disposed within the magazine and within said path, and means operated by the closing of said cover for moving said light-trap to said second or running position.

9. In combination, a film handling apparatus and a magazine for use therewith; said film magazine having a gate receiving recess, a delivery guide channel directing a film to said recess, a take-up guide channel aligned with said delivery channel for directing the film from said recess, the film bridging said recess, said channels and the space directly therebetween forming portions of an operational path for the film, a movable light trap surrounding the film as it bridges said recess, said light trap being disposed between the operational film path and the body of the magazine, and a driven motion transmitting member attached to said light trap; and said apparatus containing a compartment for the reception of said magazine, a driving motion transmitting member so positioned that when the magazine is disposed within said compartment said motion transmitting members are in engagement, and means upon said apparatus for operating said driving motion transmitting member thereby moving said light trap.

10. In combination, a film handling apparatus and a magazine for use therewith; said film handling apparatus having a compartment for the reception of said magazine and a fixed gate member which extends therewithin and into the operational path of the film to engage the film; said magazine having a recess across which the film passes in engagement with said fixed gate member when the magazine is disposed within said compartment, and a movable light-trap surrounding the film as it extends across said recess, said light-trap being movable in a direction generally normal to the longitudinal axis of the film between a fixed or protective position across said recess wherein it is disposed between the operational path of the film and the body of the magazine and adjacent but out of engagement with said fixed gate section and a second or running position wherein it is disposed within said magazine and in a portion of said operational path adjacent said portion which extends across said recess; and means for moving said light-trap between said positions.

11. In combination, a film handling apparatus and a magazine for use therewith; said magazine having a delivery support and a take-up support, a gate receiving recess therebetween, a film extending in an operational path between said supports and across said recess, a light-trap surrounding the length of film extending across the recess of said magazine and movable from a first or protective position thereacross wherein it protects the film from light and a second or running position out of said recess and within the magazine wherein it frees the film, said first position being between said operational path across said recess and the body portion of the magazine and said second position being within the magazine and coextensive with a portion of the film path, a meter for registering the amount of film which is exposed therein, and a device for preventing the operation of said meter; said apparatus including a gate for defining said operational path, said gate comprising a fixed section and two sections movable relatively thereto, a first of said movable gate sections having a film engaging surface parallel to that of said fixed gate section and being adapted to engage a side of the film and a second of said movable sections having a film engaging surface normal to said film engaging surfaces and being adapted to engage an edge of the film, means for moving said first movable section from a threading position relatively distant from said fixed section and said path to a running position relatively adjacent said fixed section wherein it engages the film supported by said magazine and extending across said recess and defines a side of said path opposite that defined by said fixed section, means for moving said light-trap from its said first to its said second position, means for moving said second movable gate section into operating position wherein it engages both of said sections and an edge of the film in order to guide it and supply an edge of said path, a pull-down claw engageable with the film for intermittently moving it through the gate, a positioning claw engageable with the film for holding it motionless within the gate, means for disabling said means for preventing the operation of said meter thereby rendering said meter operable, mechanism for back-winding the film through the gate in a direction contrary to that through which it is fed by said claw, means for clearing the gate for the free passage of the film by removal therefrom of a toothed member prior to the back-winding of the film, a film engaging member for moving the film to bring it into alignment with the aperture of said gate, and means for operating said aligning member.

12. In combination, a film handling apparatus and a magazine for use therewith; said magazine having a delivery support and a take-up support, a gate receiving recess therebetween, a film extending in an operational path between said supports and across said recess, a light-trap surrounding the length of film extending across the recess of said magazine and movable from a first or protective position thereacross wherein it protects the film from light and a second or running position out of said recess and within the magazine wherein it frees the film, said first position being between said operational path across said recess and the body portion of the magazine and said second position being within the magazine and coextensive with a portion of the film path, a meter for registering the amount of film which is exposed therein, and a device for preventing the operation of said meter; said apparatus including a gate for defining said operational path, said gate comprising a fixed section and two sections movable relatively thereto, a first of said movable gate sections having a film engaging surface parallel to that of said fixed gate section and being adapted to engage a side of the film and a second of said movable sections having a film engaging surface normal to said film engaging surfaces and being adapted to engage an edge of the film, means for moving said first movable section from a threading position relatively distant from said fixed section and said path to a running position relatively adjacent said fixed section wherein it engages the film supported by said magazine and extending across said recess and defines a side of said path opposite that defined by said fixed section, means for moving said light-trap from its said first to its said second position, means for moving said second movable gate section into operating position wherein it engages both of said sections and an edge of the film in order to guide it and supply an edge of said path, a pull-down claw engageable with the film for intermittently moving it through the gate, means for disabling said means for preventing the operation of said meter thereby rendering said meter operable, a film engaging member for moving the film to bring it into alignment with the aperture of said gate, and means for operating said aligning member.

13. In combination, a film handling apparatus and a magazine for use therewith; said magazine having a delivery support and a take-up support, a gate receiving recess therebetween, a film extending in an operational path between said supports and across said recess, a light-trap surrounding the length of film extending across the recess of said magazine and movable from a first or protective position thereacross wherein it protects the film from light and a second or running position out of said recess and within the magazine wherein it frees the film, said first position being between said operational path across said recess and the body portion of the magazine and said second position being within the magazine and coextensive with a portion of the film path, said apparatus including a gate for defining said operational path, said gate comprising a fixed section and two sections movable relatively thereto, a first of said movable gate sections having a film engaging surface parallel to that of said fixed gate section and being adapted to engage a side of the film and a second of said movable sections having a film engaging surface normal to said film engaging surfaces and being adapted to engage an edge of the film, means for moving said first movable section from a threading position relatively distant from said fixed section and said path to a running position relatively adjacent said fixed section wherein it engages the film supported by said magazine and extending across said recess and defines a side of said path opposite that defined by said fixed section, means for moving said light-trap from its said first to its said second position, means for moving said second movable gate section into operating position wherein it engages both of said sections and an edge of the film in order to guide it and supply an edge of said path, a pull-down claw engageable with the film for intermittently moving it through the gate, and a film engaging member for moving the film to bring a frame thereof into alignment with the aperture of said gate and means for operating said aligning member.

14. In combination, a film handling apparatus and a magazine for use therewith; said magazine having a delivery support and a take-up support, a gate receiving recess therebetween, a film extending in an operational path between said supports and across said recess, a light-trap surrounding the length of film extending across the recess of said magazine and movable from a first or protective position thereacross wherein it protects the film from light and a second or running position out of said recess and within the magazine wherein it frees the film, said first position being between said operational path across said recess and the body portion of the magazine and said second position being within the magazine and coextensive with a portion of the film path, said apparatus including a gate for defining said operational path, said gate comprising a fixed section and two sections movable relatively thereto, a first of said movable gate sections having a film engaging surface parallel to that of said fixed gate section and being adapted to engage a side of the film and a second of said movable sections having a film engaging surface normal to said film engaging surfaces and being adapted to engage an edge of the film, means for moving said first movable section from a threading position relatively distant from said fixed section and said path to a running position relatively adjacent said fixed section wherein it engages the film supported by said magazine and extending across said recess and defines a side of said path opposite that defined by said fixed section, means for moving said light-trap from its said first to its said second position, means for moving said second movable gate section into operating position wherein it engages both of said sections and an edge of the film in order to guide it and supply an edge of said path, and a pull-down claw engageable with the film for intermittently moving it through the gate.

15. In a film handling apparatus, a gate, said gate comprising two sections which engage opposite sides of a film, means for causing relative movement between said gate sections whereby a film may be originally inserted therebetween, a fixed guide engaging one edge of the film and spanning the space between said gate sections when said gate sections are in closed or running position, a movable guide for the edge of the film opposite that engaged by said fixed guide, and means for moving said movable guide to operative position wherein it engages an edge of the film, said moving means including instrumentalities for first moving said movable edge guide in a direction generally parallel to the optical axis of the apparatus and spaced from the relatively adjacent edge of the film and thereafter for moving said edge guide toward said optical axis and into engagement with said adjacent edge.

16. In a film handling apparatus, a gate, said gate comprising two sections which engage opposite sides of a film, a movable gate section and a fixed gate section, a fixed guide engaging one edge of the film and spanning the space between said gate sections when said gate sections are in closed or running position, a movable guide for the edge of the film opposite that engaged by said fixed guide, and sequential control means operatively interconnecting said movable gate section and said movable edge guide for moving said movable guide to operative position wherein it engages an edge of the film, said moving means including instrumentalities for first moving said movable edge guide in a direct parallel to the optical axis of the apparatus and spaced from the relatively adjacent edge of the film, second for moving said edge guide toward said optical axis and into engagement with said adjacent edge, and third for moving said movable gate section into closed or running postion.

17. In a film handling apparatus, a lens, a film receiving compartment, said compartment having side walls and a bottom wall or floor, an apertured gate section which extends from one of said side walls into said compartment opposite said lens for establishing the focal plane of said lens, said fixed gate section being spaced from said floor of said compartment, a gate section parallel to said fixed gate section and movable relatively thereto along the optical axis of the lens, a movable edge guiding section disposed between said fixed gate section and said floor of said compartment and movable between a first or threading position wherein its leading edge is disposed clear of a projection of the focal plane of said lens and a second or running position wherein its leading edge is advanced first across said projection and second toward said movable gate section to engage that edge of the film which is disposed between the optical axis and the floor of the compartment, and within said focal plane.

18. In combination, a film handling apparatus and a magazine for use therewith; said magazine having means for exposing a film supported therewithin and a guide for one edge of the section of the film which is being exposed; said apparatus having a compartment for receiving said magazine, at least one gate section engaging a side of the film supported by said magazine, a movable guide cooperating with said gate section for engaging the edge of the film opposite that which is engaged and guided by said edge guide upon said magazine when said magazine is disposed within said compartment, said edge guide upon said apparatus being movable between a first or threading position wherein it is disposed relatively distantly from the operational path of the film in the apparatus and a second or running position wherein it engages said opposite edge of the film, and means for moving said edge guide from said first to said second position after said magazine has been disposed in said compartment.

19. In combination, a film handling apparatus and magazine for use therewith; said magazine including a housing, means therein for supporting a delivery mass, means for supporting therewithin a take-up mass, an operable lock for preventing unwanted rotation of said delivery mass, and means for exposing a section of the film intermediate said masses; said apparatus including a gate having two members, at least one of which is movable relatively to the other thereof, for engaging opposite sides of the film, an edge guide movable between a first or threading position relatively remote from the operational path of the film in the apparatus and a second or running position wherein it forms one side of the operational path and engages an edge of the film, and control mechanism operatively interconnecting said locking means when the magazine is disposed within the apparatus and said edge guide for concomitantly moving said edge guide from said first to said second position and unlocking said delivery coil.

20. In combination, a film handling apparatus and a magazine for use therewith, said magazine including a housing for supporting a delivery coil and a take-up coil of the film and a recess therebetween across which a section of the film intermediate said coils may pass and an edge guide for the film spanning one side of said recess and engaging and guiding an edge of the film; said apparatus including a magazine receiving compartment; two gate sections disposed within said compartment for defining the operational path of a film disposed within a magazine when said magazine is positioned within said compartment, one of said gate sections being movable relatively to the other thereof between a first or threading position wherein space intervenes therebetween for the reception of a film supported by the magazine and a second or running position wherein said gate sections engage opposite sides of the film and define portions of the sides of its operational path, an edge guide movable between a first or threading position relatively distant from the operational path and a second or running position wherein it engages the side of the film opposite that engaged by the edge guide carried by said magazine, and means operatively interconnecting said edge guide and said movable gate section for concomitantly operating both thereof.

21. In a film handling apparatus, a film receiving compartment, a cover therefor, a delivery support and a take-up support disposed within said compartment, a gate disposed between said supports for engaging a film therebetween and forming a portion of its operational path, said gate comprising a fixed section and a section movable relatively thereto, means for moving said movable section toward said fixed section, a member engaging the film in said path for moving the film therethrough from said delivery support towards said take-up support, mechanism for driving said film feeding member and said take-up support, and control mechanism for said gate moving means, said control mechanism including actuating means engageable by said cover as it is closed, instrumentalities operated by said actuating means which place said control mechanism in condition for instant operation following a first portion of the closing movement of said cover and instrumentalities also operated by said actuating means which quickly operate said mechanism upon the final closing movement of said cover.

22. In a film handling apparatus, a film receiving compartment, a cover therefor, a gate disposed therewithin, said gate comprising a fixed section and a section movable relatively thereto between a first or threading position wherein said sections are separated and a second or running position wherein said sections are disposed relatively adjacent each other and define a portion of the operational path of the film through said apparatus, resilient means for moving said gate section from said first to said second position, an actuating member engageable by said cover as it is closed, and connections between said actuating member and said resilient means for subjecting said resilient means to tension following a first portion of the closing movement of said cover and releasing said resilient means instantly to close said gate by the final portion of said closing movement.

23. In a film handling apparatus, a film receiving compartment, a cover therefor, a gate disposed within said compartment, said gate comprising a fixed section and a section movable relatively thereto from a running position wherein it is disposed relatively adjacent said fixed section wherein it forms a portion of an operational path for the film and a threading position relatively distant from said fixed section, resilient means for moving said movable gate section from said running to said threading position thereby separating said gate sections, resilient means for operating said gate moving means, an actuating member operatively connected to said resilient means and engageable by said cover as it is closed and opened, means operated by said actuating member for placing said resilient means under tension when said cover is closed, and means operated by a first portion of the opening movement of said cover for quickly releasing said resilient means thereby quickly moving said gate sections apart before said cover can be completely opened.

24. In combination, a film handling apparatus and magazine for use therewith; said film handling apparatus having for a compartment for the reception of said magazine, a first gate member which extends backwardly therewithin and forms a forward portion of the operational path of the film, and a cover for said compartment; said magazine having a recess across which the film passes and a movable light-trap surrounding the film as it extends across said recess, said light-trap being movable between a first or protective position across said recess wherein it is disposed out of engagement with said fixed gate member and between the operational path of the film and a second or running position wherein it is disposed within the magazine and bounding a portion of said path which lies within said magazine, and means operated by the closing of said cover for moving said light trap to said second or running position.

25. In a film handling apparatus adapted for the reception of a magazine, said magazine having channel forming guides which establish an operational path for the film a portion of which is exposed to light, a light-trap for protecting such exposed portion of the film from light, and operating means for moving said light-trap from protective position to running position, said moving means including resilient driving means; said apparatus including a film receiving compartment, a motion transmitting member so disposed within said compartment that when said magazine is placed therewithin it engages said means for moving said light-trap, a cover for closing said compartment, means connecting said member and said resilient means for placing said resilient means under tension during the first portion of the closing movement of said cover, and means connecting said member and said operating means for releasing said resilient means upon a final portion of such closing movement whereby said light-trap is quickly moved from protective to running position as said cover is substantially closed.

26. In a film handling apparatus, a film receiving compartment, a cover for said compartment, a support within said compartment for a film, means for moving the film in relation to said support, means for driving said moving means, a source of power, means for applying said source of power to said driving means, means for blocking the application of said source of power to said driving means, and means for removing said blocking means from blocking position, said removing means include an actuating member engageable by a concluding portion of the closing movement of said cover and a connection between said actuating member and said blocking means for moving said blocking means from blocking relation.

27. In a film handling apparatus, a film receiving compartment, a support for a film therewithin, a member for feeding the film in relation to said support, a source of power, control means for applying said source of power to said member whereby said member feeds the film, means for blocking the operation of said power applying means, and an actuating member extending between said blocking means and said cover for moving said blocking means to blocking position when said cover is opened.

28. In a film handling apparatus, a film receiving compartment, a cover therefor, a support within said compartment for a film, means for feeding a film in relation to said support, a meter for recording the amount of film which has been fed in relation to said support, means for locking said meter against movement, and an actuating connection between said cover and said locking means for rendering said locking means operative when said cover is opened.

29. In a film handling apparatus, a film receiving compartment, a cover therefor, a support within said compartment for a film, means for feeding a film in relation to said support, a meter for recording the amount of film which has been fed in relation to said support, means for locking said meter against movement, and an actuating connection between said cover and said locking means for rendering said locking means inoperative when said cover is closed.

30. In a film handling apparatus, a film receiving compartment, a cover therefor, a delivery support and a take-up support between which a film extends, a gate engaging the film between said supports, said gate including a fixed member and a member movable relatively thereto, a member engaging the film for feeding it through said gate and from one of said supports toward the other thereof, a movement control mechanism for said feeding member for controlling said member in the manner desired, said mechanism including an actuating member movable between a threading position a normal exposing position a locked exposing position a single picture exposing position and a back winding position, a main control mechanism separate from said single control member for moving said movable gate section, an actuating member for said main control mechanism which is so disposed as to be operated by the movement of said cover, and a connection between said single control member and said main control mechanism whereby said single control member is rendered inoperable except when said main control mechanism has been operated to place said movable gate section in close relation to said fixed gate section.

31. In combination, a film handling apparatus and a magazine for use therewith, a meter disposed upon said magazine for recording the footage of the film supported thereby which has been fed, a meter disposed upon said apparatus for recording the footage of the film which has been fed therethrough, means upon said apparatus for feeding the film, and an operative interconnection between said meters whereby one thereof is operated by the other when said magazine is supported within said apparatus.

32. In combination, a film handling apparatus and a magazine for use therewith, a footage recording meter upon said magazine, a footage recording meter upon said apparatus, means for supporting said magazine upon said apparatus, means for feeding the film, and an operative connection between said meters effective when said magazine is disposed upon said apparatus for operating said meter of said apparatus by said meter of said magazine.

33. In combination, a film handling apparatus and a magazine for use therewith, a first footage recording meter upon said magazine, a second footage recording meter upon said apparatus, means for supporting said magazine upon said apparatus, means for feeding the film, a movable interconnection effective when said magazine is supported upon said apparatus for operating said first meter by the operation of said second meter.

34. In combination, a film handling apparatus and magazine for use therewith, a first footage recording meter upon said magazine, a member supported by said magazine and engaging the film and operatively interconnected with said first meter for driving said first meter to record the footage in said magazine which has been fed, means for feeding the film, a second meter upon said apparatus, means for supporting said magazine upon said apparatus, and an operating interconnection effective when said magazine is disposed upon said apparatus for driving said second meter by said first meter.

35. In combination, a film handling apparatus and magazine for use therewith, a first footage recording meter upon said magazine, a member supported by said apparatus and engaging the film and operatively interconnected with said first meter for driving said first meter to record the footage in said magazine which has been exposed, means for feeding the film, a second meter upon said magazine, means for supporting said magazine upon said apparatus, and an operating interconnection effective when said magazine is disposed upon said apparatus for driving said second meter by said first meter.

36. In combination, a film handling apparatus and a magazine for use therewith, said apparatus including a magazine receiving compartment, a cover therefor, a first meter upon said magazine for recording the footage of the film which has been fed, means for feeding the film, a second meter upon said apparatus, an operative interconnection between said meters effective when said magazine is disposed within said apparatus for driving one of said meters by the other thereof whereby each records the amount of film which has been fed, and means for resetting the meter upon said apparatus when said cover is opened, the meter upon said magazine being unaffected thereby.

37. In combination, a film handling apparatus and a magazine for use therewith, said apparatus including a magazine receiving compartment, a gate section movable therewithin, means for moving said gate section, a first meter upon said magazine for recording the footage of the film which has been fed, means for feeding the film, a second meter upon said apparatus, an operative interconnection between said meter effective when said magazine is disposed within said apparatus for driving one of said meters by the other thereof whereby each records the amount of film which has been fed, and means operatively interconnecting said movable gate section and said second meter upon said apparatus for resetting said second meter when said gate section is moved, the meter upon said magazine being unaffected thereby.

38. In combination, a film handling apparatus and a magazine for use therewith; said magazine including a device for recording the amount of film which has been fed therein, means for feeding the film, and means for locking said recording device against movement; and said apparatus including a compartment for the reception of said magazine, and means for operating said locking means to lock said meter concomitantly with the removal of said magazine from said compartment.

39. In combination, a film handling apparatus and a magazine for use therewith, said magazine including a device for recording the amount of film which has been fed therein, means for feeding the film, and means for locking said recording device against movement; and said apparatus including a compartment for the reception of said magazine, and means for operating said locking means to unlock said meter concomitantly with the introduction of said magazine into said compartment.

40. In combination, a film handling apparatus and a magazine for use therewith, a first meter upon said magazine for recording the amount of film fed therein, a second meter upon said apparatus for recording the amount of film fed by said apparatus, means for feeding the film, means for mounting said magazine upon said apparatus, connective mechanism effective when said magazine is mounted upon said apparatus for operating one of said meters by the other thereof, said connective mechanism including a motion transmitting member upon said magazine, and means effective when said magazine is removed from said apparatus for rendering said motion transmitting member inoperable.

41. In combination, a film handling apparatus and a magazine for use therewith, a first meter upon said magazine for recording the amount of film fed therein, a second meter upon said apparatus for recording the amount of film fed by said apparatus, means for feeding the film, means for mounting said magazine upon said apparatus, connective mechanism effective when said magazine is mounted upon said apparatus for operating one of said meters by the other thereof, said connective mechanism including a first motion transmitting member mounted upon said apparatus and connected with said first meter, a second motion transmitting member connected to said second meter and engageable with said first member when said magazine is mounted upon said apparatus, a cover movable to a position wherein it encloses said second member, and means effective when said magazine is removed from said apparatus for operating said cover to enclose said motion transmitting member so that it can not be operated while said magazine is without said apparatus.

42. In combination, a film handling apparatus and a magazine for use therewith, a first meter upon said magazine for recording the amount of film fed therein, a second meter upon said apparatus for recording the amount of film fed by said apparatus, means for feeding the film, means for mounting said magazine upon said apparatus, connective mechanism effective when said magazine is mounted upon said apparatus for operating one of said meters by the other thereof, said connective mechanism including a first motion transmitting member mounted upon said apparatus and connected with said first meter, a second motion transmitting member upon said magazine and connected to said second meter and engageable with said first member when said magazine is mounted upon said apparatus, a cover movable from and to a position wherein it encloses said second member, and means effective when said magazine is placed upon said apparatus for moving said cover to open position whereby said first and second members may engage and one of said meters be driven by the other thereof.

43. In a film handling apparatus adapted for the alternative reception of a magazine and a film upon open reels and having film feeding means, a meter for recording the footage of film which is fed by said apparatus, said meter having two dials, one of said dials being manually movable relatively to other thereof, common driving mechanism for both of said dials, and means alternatively operated by a film housed within a magazine or supported upon an open reel for driving said mechanism.

44. In a film handling apparatus adapted for the alternative reception and feeding of films of different widths, a meter for recording the amount of film of both widths which has been fed by said apparatus, a first actuating member engageable with a first of said films and not by the second thereof for driving said meter, and a second actuating member engageable with the second of said films but not the first thereof for driving said meter.

45. In a film handling apparatus adapted for the alternative reception and feeding of films of different widths, a meter for recording the amount of film of both widths which has been fed by said apparatus, said meter having two dials one of which is manually movable relatively to the other thereof, common driving mechanism for said dials, a first actuating member engageable with a first of said films but not by the second thereof for operating said driving mechanism, and a second actuating member engageable with second of said films but not the first for alternatively operating said driving mechanism.

46. A film magazine including means for exposing a portion of a film supported thereby to light, an operable light-trap for portecting said exposed portion of the film, a meter for recording the amount of film which has been fed in said magazine, means for locking said meter against movement, and an operating connection between said locking means and said light-trap for operating said locking means upon the movement of said light-trap.

47. A film magazine including means for exposing a portion of a film supported thereby to light, an operable light-trap for protecting said exposed portion of the film, a meter for recording the amount of film which has been fed in said magazine, means for locking said meter against movement, and an operating connection between said locking means and said light-trap and including instrumentalities for operating said locking means upon the movement of said light-trap to film protective position.

48. A film magazine including means for exposing a portion of a film supported thereby to light, an operable light-trap for protecting said exposed portion of the film, a meter for recording the amount of film which has been fed in said magazine, means for locking said meter against movement, means for unlocking said locking means, and an operating connection between said unlocking means and said light-trap and including instrumentalities for operating said unlocking means upon the movement of said light-trap to film exposing position.

49. In combination, a film handling apparatus and a magazine for use therewith; said magazine including means for exposing a portion of the film to light, an operable light-trap for protecting said exposed portion, a meter for recording the amount of film which has been fed in said magazine, said meter including a motion transmitting connection and a cover for said connection; said apparatus including means for mounting said magazine therewithin, control mechanism, a connection between said control mechanism and said light trap and said motion transmitting member of said meter which is effective when said magazine is mounted within said apparatus, and an actuating member the movement of which moves said light-trap to light exposing position and moves said cover to closed position preparatory to the removal of the magazine from the apparatus.

50. A delivery spindle, a take-up spindle, means therebetween for establishing an operational path for the film therebetween, powered means for feeding the film through said path in a forward direction, manual means for winding the film back through said path in a reverse direction, and means operatively interconnecting said forward feeding and back winding means and containing instrumentalities which prevent the operation of said manual back winding means until said powered means have been rendered inoperable.

51. In a film handling apparatus, a delivery spindle and a take-up spindle, guiding means for establishing an operational path for a film therebetween, means engaging the film in said path for feeding it in an exposing direction from said delivery spindle toward said take up spindle through said path, means for winding the film back from said take-up spindle toward said delivery spindle, a one way clutch controlling said delivery spindle for permitting its rotation only in an exposing direction, mechanism for driving said feeding means, and control mechanism operatively interconnecting said driving mechanism and said one way clutch and containing instrumentalities for rendering said one way clutch inoperative whereby said back winding means can be applied to said delivery spindle and concomitantly rendering said driving mechanism inoperable thereby preventing the possibility of conflict.

52. In a film handling apparatus, a delivery spindle and a take up spindle, guiding means for establishing an operational path for a film therebetween, means engaging the film in said path for feeding it in an exposing direction from said delivery spindle toward said take-up spindle, means for winding the film back from said take-up spindle toward said delivery spindle, a one-way clutch controlling said delivery spindle for permitting its rotation only in an exposing direction, mechanism for driving said feeding means, and control mechanism operatively interconnecting said driving mechanism and said one way clutch and containing instrumentalities for rendering said one way clutch operative whereby said back winding means can not be applied to said delivery spindle and concomitantly rendering said driving mechanism operable thereby preventing the possibility of conflict.

53. In a film handling apparatus, a delivery spindle, a take-up spindle, guiding means establishing an operating path for the film between said spindles, means for feeding the film along said path in an exposing direction, a source of power for said feeding means, means for applying power from said source to said feeding means, means for blocking the operation of said power applying means, manual means for winding said delivery spindle in reverse direction whereby the film is moved backwardly from said take-up spindle toward said delivery spindle, means for disabling said manual back-winding means, and means operatively interconnecting said disabling means and said blocking means for alternatively operating each thereof.

54. In a film handling apparatus, a delivery spindle and a take-up spindle between which a film extends, an openable gate disposed between said spindles, means for closing said gate, means for feeding a film through said gate from said delivery spindle toward said take-up spindle, driving mechanism for said feeding means and said take-up spindle, control mechanism operatively interconnecting said gate closing means and said driving mechanism for operating both thereof, auxiliary means movable into engagement with said delivery spindle for moving said delivery spindle in a reverse or back-winding direction whereby the film is moved in a reverse direction from said take-up spindle toward said delivery spindle, and means operatively interconnected with said control mechanism and said means for backwinding said delivery member and including instrumentalities which prevent the operation of said back winding means unless said gate is closed and said driving mechanism is disabled, whereby the film can be back wound only through a closed gate and after the forward driving mechanism of the apparatus has been rendered inoperative.

55. In a film handling apparatus, powered means for feeding a film only in a forward or exposing direction, manual means for feeding a film only in a reverse or back winding direction, and an operative connection between said means for preventing the operation of one of said means while the other thereof is operable.

56. In a film handling apparatus, a delivery spindle, powered means for drawing a film from said delivery spindle, auxiliary manual means engagable with said delivery spindle for revolving said delivery spindle in a reverse direction whereby a film is moved in a reverse or back winding direction and coiled upon said delivery spindle, means locking said spindle against such reverse or back winding movement, means operatively interconnecting said locking means and said drawing means and including instrumentalities which necessarily disable said drawing means before said locking means can be released.

57. In a film handling apparatus, a delivery spindle, a toothed member for drawing a film from said delivery spindle and advancing it in an exposing direction, powered means for driving said toothed member, auxiliary manual means for moving said delivery spindle in a reverse or back winding direction, means for rendering said manual means operable upon said spindle, and mechanism operatively interconnecting said means for rendering said manual means operable upon said spindle and said driving mechanism and said toothed member and including instrumentalities for necessarily first disabling said driving mechanism and withdrawing said toothed member from engagement with the film and thereafter operating said means which render said manual means operable upon said delivery spindle.

58. In an apparatus for handling a perforated film, means establishing an operational path for the film, a toothed member for engaging successive perforations of the film in said path for feeding it therealong, and an auxiliary framing member engaging a perforation of said film for initially and necessarily disposing it in a predetermined position in said path wherein one of its perforations is in line with said toothed feeding member.

59. In an apparatus for handling a perforated film, means establishing an operational path through which a perforated film is fed, a member for engaging successive perforations of the film in said path for feeding it therealong, an auxiliary toothed feeding member for engaging a perforation of said film for initially and necessarily disposing it in a predetermined position in alignment with said feeding member, and means for withdrawing said auxiliary member from engagement with the film prior to the operation of said feeding member.

60. In an apparatus for handling a perforated film, means establishing an operational path for the film, a toothed member for engaging successive perforations of the film in said path for feeding it therealong, auxiliary threading means for feeding the film along said path prior to the starting of the regular feeding operation, and means necessarily effective for arresting the movement of said auxiliary feeding means with a perforation of the film in alignment with said toothed feeding means so that upon the starting of the regular feeding operation said tooth immediately engages a perforation of the film.

61. In an apparatus for handling a perforated film, means establishing an operational path for the film, a toothed member for engaging successive perforations of the film in said path for feeding it therealong, auxiliary threading means for feeding the film in said path prior to the start of the regular feeding operation, means necessarily effective for arresting the movement of said auxiliary feeding means with a perforation of the film in alignment with said toothed feeding means so that upon the starting of the regular feeding operation said tooth immediately engages a perforation of the film, and means for rendering said auxiliary threading means ineffective upon the film prior to the starting of the regular feeding operation.

62. In an apparatus for handling a perforated film, means establishing a path for the film, a toothed member for engaging successive perforations of the film in said path for feeding it therealong, auxiliary threading means for feeding the film along said path prior to the starting of the regular feeding operation, means necessarily effective for arresting the movement for said auxiliary feeding means with a perforation of the film in alignment with said toothed feeding means so that upon the starting of the regular feeding operation said tooth immediately engages a perforation of the film, means for starting the operation of said toothed feeding member for regularly feeding the film, and means operatively interconnecting said starting means and said auxiliary feeding means for preventing the operation of said means for operating said regular feeding member until said auxiliary feeding means has been operated.

63. In an apparatus for handling a perforated film, means establishing an operational path for the film, a toothed member for engaging successive perforations of the film in said path for feeding it therealong, mechanism for driving said toothed member, auxiliary threading means for feeding the film along said path, means operatively interconnected with said auxiliary feeding means for necessarily stopping the operation of said auxiliary means with one of the perforations of the film opposite said toothed member, control mechanism operatively interconnecting said driving mechanism and said auxiliary feeding means, and a single actuating member for said control mechanism.

64. In an apparatus for handling a perforated film, means establishing an operational path for the film, a toothed member for engaging successive perforations of the film in said path for feeding it therealong, auxiliary threading means for initially feeding the film along said path, means operatively interconnected with said auxiliary means for necessarily stopping its operation with a perforation of the film disposed opposite said toothed member, mechanism for driving said toothed member, and sequential control means operatively interconnecting said driving mechanism and said arresting means and including instrumentalities for first operating said arresting means and thereafter starting the operation of said driving mechanism.

65. In an apparatus for handling a perforated film, means establishing an operational path for the film, a toothed member for engaging successive perforations of the film in said path for feeding it therealong, auxiliary threading means for initially feeding the film along said path, means operatively interconnected with said auxiliary means for necessarily stopping its operation with a perforation of the film disposed opposite said toothed member, mechanism for driving said toothed member, and sequential control means operatively interconnecting said driving mechanism and said arresting means and including instrumentalities for preventing the operation of said driving mechanism until after said arresting means has been operated.

66. In an apparatus for handling a perforated film, guides for establishing an operational path through which the film is fed, a member for engaging successive perforations of the film in said path for feeding it therealong, operable means for aligning the film in said path with one of its perforations opposite a tooth of said member, means for pressing the film into engagement with said member, and control mechanism operatively interconnecting both of said means for operating each thereof.

67. In an apparatus for handling a perforated film, guides for establishing an operational path through which the film is fed, a member for engaging successive perforations of the film in said path for feeding it therealong, operable means for aligning the film in said path with one of its perforations opposite a tooth of said member, means for pressing the film into engagement with said member, and control mechanism operatively interconnecting both of said means and containing instrumentalities which first operate said aligning means and thereafter operate said pressing means.

68. In an apparatus for handling a perforated film, giudes for establishing an operational path through which the film is fed, a member for engaging successive perforations of the film in said path for feeding it therealong, means for driving said feeding member, operable means for aligning the film in said path with one of its perforations opposite a tooth of said member, means for pressing the film into engagement with said member, and control mechanism operatively interconnecting all of said means for operating all thereof.

69. In an apparatus for handling a perforated film, guides for establishing an operational path through which the film is fed, a member for engaging successive perforations of the film in said path for feeding it therealong, means for driving said feeding member, operable means for aligning the film in said path with one of its perforations opposite a tooth of said member, means for pressing the film into engagement with said member, and sequential control mechanism operatively interconnecting all of said means and containing instrumentalities for first operating said alignment means, second operating said pressing means, and third actuating said driving means.

70. In an apparatus for handling a perforated film, means establishing an operational path for the film therethrough, a toothed member engaging a perforation of the film in said path for feeding it therealong, means for removing said toothed member from said path, means for winding the film backwardly through said path by traction thereupon, said backwinding operation tending to destroy the alignment between the perforations of the film and said toothed member, means for re-establishing such alignment, and means for operating said toothed member to feed the film along said path after said alignment has been re-established.

71. In an apparatus for handling a perforated film, means establishing an operational path for the film, a toothed member for engaging successive perforations of the film in said path for feeding it therealong, a meter for recording the amount of film fed along said path, means for aligning a perforation of the film and said toothed member, and control mechanism operatively interconnecting said aligning means and said meter for preventing the operation of said meter until a perforation of the film has been brought into alignment with said toothed member.

72. In combination, an apparatus for handling a perforated film and a magazine for use therewith; said magazine having means for supporting a delivery coil and a take-up coil of the film, means establishing a channel between said coils, and means for positioning the film with the perforations thereof in predetermined relation to said path; said apparatus having a compartment for receiving said magazine and a toothed member for feeding the film through the channel of said magazine when said magazine is disposed within said compartment; said predetermined position of said perforations of the film in relation to the said channel being in alignment with the position of said member when it is at rest, when said magazine is positioned within said compartment whereby when the operation of said member is started it will immediately enter a perforation of the film.

73. In an apparatus for handling a perforated film, a film receiving compartment, means for establishing a path for the film within said compartment, a cover for said compartment, a toothed member for engaging perforations of the film in said path for advancing it therealong, means for aligning a perforation of the film with the tooth of said member whereby when said member begins to operate it will immediately engage one of said perforations, and means operatively interconnected with said aligning means and operated by the closing of said cover for operating said aligning means.

74. In a film magazine, means for forming a channel through which a perforated film is fed, a portion of said channel extending without said magazine, a light-trap for protecting the section of the film without said magazine, means for moving said light-trap from and to protective relation with the film, means for moving a perforation of the film into predetermined longitudinal position in relation to said channel, and a connection between said light-trap and said moving means whereby both are operated concomitantly.

75. In a magazine for handling a perforated film, a toothed member for engaging a perforation of the film, means for bodily moving said member in a longitudinal direction along the film with the tooth of said member engaging the film in line with the perforations thereof until its tooth engages one of said perforations and for continuing said movement to bring said perforation into a predetermined position, and means for thereupon removing said tooth from said perforation.

76. In a magazine for housing a perforated film, means for establishing a channel through which the film is fed, a portion of said channel extending to a point without said magazine, a light-trap protecting said portion of the film so exposed, means for moving the film to place a perforation of the film in predetermined position along said channel, means for moving said light-trap from protective position, and means operatively interconnecting said moving means and said aligning means for preventing the movement of said light-trap away from protective position until said aligning means has been operated.

77. In a magazine for handling a perforated film, means for forming a channel for the film, said channel containing a portion which admits light to the film, a light-trap movable between a protective position wherein it prevents light from reaching the film and a running position wherein it admits light to the film, a toothed member engaging a perforation of the film for moving the film along said channel, said toothed member being mounted upon said light-trap for movement therewith, and means for bringing said toothed member into and out of engagement with a perforation of the film whereby the film is moved along said channel by the movement of said light-trap.

78. In a magazine for handling a perforated film, means forming a channel through which the film is moved, a meter for recording the amount of film which is moved through said channel, means for locking said meter against movement, means for aligning a perforation of the film in predetermined position along said channel, and means operatively interconnecting said aligning means and said locking means for maintaining said locking means operative until said aligning means has been operated.

OLIVER WHITWELL WILSON.
WARREN DUNHAM FOSTER.